United States Patent
Dick et al.

(10) Patent No.: US 7,853,795 B2
(45) Date of Patent: Dec. 14, 2010

(54) SYSTEM, METHOD AND COMPUTER PROGRAM PRODUCT FOR GUARANTEEING ELECTRONIC TRANSACTIONS

(75) Inventors: Kevin Stewart Dick, Palo Alto, CA (US); Eric Kenneth Rescorla, Palo Alto, CA (US)

(73) Assignee: Network Resonance, Inc., Palo Alto, CA (US)

( * ) Notice: Subject to any disclaimer, the term of this patent is extended or adjusted under 35 U.S.C. 154(b) by 1160 days.

(21) Appl. No.: 10/977,399

(22) Filed: Oct. 28, 2004

(65) Prior Publication Data

US 2005/0091540 A1  Apr. 28, 2005

Related U.S. Application Data

(63) Continuation of application No. 10/215,768, filed on Aug. 9, 2002, now Pat. No. 6,874,089.

(60) Provisional application No. 60/359,579, filed on Feb. 25, 2002.

(51) Int. Cl.
*H04L 9/32* (2006.01)
(52) U.S. Cl. .................. 713/178; 713/176; 713/160; 380/229; 726/13; 726/14; 726/23; 709/229
(58) Field of Classification Search .............. 726/14, 726/13, 23; 713/155, 178, 176, 160; 380/229, 380/278, 286, 37; 707/10; 709/229
See application file for complete search history.

(56) References Cited

U.S. PATENT DOCUMENTS 4,625,076 A  11/1986  Okamoto et al.
4,868,877 A  9/1989  Fischer
4,881,264 A  11/1989  Merkle (Continued)

FOREIGN PATENT DOCUMENTS

EP  0786883 A1  7/1997

(Continued)

OTHER PUBLICATIONS

Cisco, "Cisco 3200 Mobile Access Bouters," 2 pgs, Copyright 1992-2002 Cisco Systems, inc. URL: http://www.cisco.com/warp/pbulic/cc/pd/rt/ps272/.

(Continued)

*Primary Examiner*—Kambiz Zand
*Assistant Examiner*—Tongoc Tran
(74) *Attorney, Agent, or Firm*—Paul, Hastings, Janofsky & Walker LLP

(57) ABSTRACT

A system, method and computer program product for guaranteeing a data transaction over a network are disclosed. When a data transaction between at least a server and a client is detected on a network, data transmitted via the network between the server and client during the data transaction is captured. At least one identifier is associated with the captured data. A timestamp is also generated for the captured data. The timestamp includes information therein identifying at least a portion of the identifier(s). The captured data, the identifier(s) and the timestamp are stored in one or more data stores. The identifier(s) associated with the stored captured data is also mapped to an entry in an index to permit retrieval of the stored data from the data store via the index.

14 Claims, 11 Drawing Sheets

U.S. PATENT DOCUMENTS

| | | | |
|---|---|---|---|
| 5,136,646 A * | 8/1992 | Haber et al. | 713/178 |
| 5,136,647 A | 8/1992 | Haber et al. | |
| 5,235,642 A | 8/1993 | Wobber et al. | |
| 5,373,561 A | 12/1994 | Haber et al. | |
| RE34,954 E | 5/1995 | Haber et al. | |
| 5,533,021 A | 7/1996 | Branstad et al. | |
| 5,615,109 A | 3/1997 | Eder | |
| 5,640,456 A | 6/1997 | Adams, Jr. et al. | |
| 5,671,364 A | 9/1997 | Turk et al. | |
| 5,691,917 A | 11/1997 | Harrison | |
| 5,781,629 A * | 7/1998 | Haber et al. | 713/177 |
| 5,781,729 A | 7/1998 | Baker et al. | |
| 5,799,016 A | 8/1998 | Onweller | |
| 5,835,726 A | 11/1998 | Shwed et al. | |
| 5,878,218 A | 3/1999 | Maddalozzo et al. | |
| 5,917,911 A | 6/1999 | Dabbish et al. | |
| 5,925,108 A | 7/1999 | Johnson et al. | |
| 6,012,098 A | 1/2000 | Bayeh et al. | |
| 6,021,397 A | 2/2000 | Jones et al. | |
| 6,032,193 A | 2/2000 | Sullivan | |
| 6,067,288 A | 5/2000 | Miller et al. | |
| 6,075,796 A | 6/2000 | Katseff | |
| 6,076,071 A | 6/2000 | Freeny, Jr. et al. | |
| 6,118,936 A | 9/2000 | Lauer et al. | |
| 6,144,945 A | 11/2000 | Garg et al. | |
| 6,148,290 A | 11/2000 | Dan et al. | |
| 6,167,448 A | 12/2000 | Hemphill et al. | |
| 6,178,244 B1 * | 1/2001 | Takeda et al. | 380/277 |
| 6,212,190 B1 | 4/2001 | Mulligan | |
| 6,236,972 B1 | 5/2001 | Shkedy | |
| 6,246,771 B1 * | 6/2001 | Stanton et al. | 380/286 |
| 6,286,030 B1 | 9/2001 | Wenig et al. | |
| 6,314,402 B1 | 11/2001 | Monaco et al. | |
| 6,351,467 B1 | 2/2002 | Dillon | |
| 6,363,477 B1 | 3/2002 | Fletcher et al. | |
| 6,381,344 B1 | 4/2002 | Smithies et al. | |
| 6,393,102 B1 | 5/2002 | Drew et al. | |
| 6,401,074 B1 | 6/2002 | Sleeper | |
| 6,405,179 B1 | 6/2002 | Rebane | |
| 6,405,212 B1 | 6/2002 | Samu et al. | |
| 6,408,404 B1 | 6/2002 | Ladwig | |
| 6,456,986 B1 | 9/2002 | Boardman et al. | |
| 6,484,203 B1 | 11/2002 | Porras et al. | |
| 6,490,292 B1 | 12/2002 | Matsuzawa | |
| 6,539,392 B1 | 3/2003 | Rebane | |
| 6,643,652 B2 | 11/2003 | Helgeson et al. | |
| 6,662,192 B1 | 12/2003 | Rebane | |
| 6,697,809 B2 | 2/2004 | Chen et al. | |
| 6,714,979 B1 | 3/2004 | Brandt et al. | |
| 6,724,933 B1 | 4/2004 | Lin et al. | |
| 6,732,102 B1 | 5/2004 | Khandekar | |
| 6,732,153 B1 | 5/2004 | Jakobson et al. | |
| 6,742,119 B1 | 5/2004 | Peyravian et al. | |
| 6,766,368 B1 | 7/2004 | Jakobson et al. | |
| 6,772,216 B1 | 8/2004 | Ankireddipally et al. | |
| 6,785,682 B2 | 8/2004 | Todd | |
| 6,826,405 B2 | 11/2004 | Doviak et al. | |
| 6,826,582 B1 | 11/2004 | Chatterjee et al. | |
| 6,941,557 B1 | 9/2005 | Jakobson et al. | |
| 7,010,478 B2 | 3/2006 | Mathur et al. | |
| 7,051,071 B2 | 5/2006 | Stewart et al. | |
| 7,069,335 B1 | 6/2006 | Layman et al. | |
| 7,162,448 B2 | 1/2007 | Madoff et al. | |
| 2001/0021252 A1 | 9/2001 | Carter et al. | |
| 2002/0016964 A1 | 2/2002 | Aratani et al. | |
| 2002/0023221 A1 | 2/2002 | Miyazaki et al. | |
| 2002/0032865 A1 | 3/2002 | Golubchik et al. | |
| 2002/0035606 A1 | 3/2002 | Kenton | |
| 2002/0038363 A1 | 3/2002 | Maclean | |
| 2002/0056091 A1 | 5/2002 | Bala et al. | |
| 2002/0072951 A1 | 6/2002 | Lee et al. | |
| 2002/0073232 A1 | 6/2002 | Hong et al. | |
| 2002/0078384 A1 * | 6/2002 | Hippelainen | 713/201 |
| 2002/0080958 A1 * | 6/2002 | Ober et al. | 380/44 |
| 2002/0091605 A1 | 7/2002 | Labe et al. | |
| 2002/0120711 A1 | 8/2002 | Bantz et al. | |
| 2002/0120850 A1 | 8/2002 | Walker et al. | |
| 2002/0138744 A1 | 9/2002 | Schleicher et al. | |
| 2002/0174218 A1 | 11/2002 | Dick et al. | |
| 2002/0174340 A1 | 11/2002 | Dick et al. | |
| 2003/0021275 A1 | 1/2003 | Shabeer | |
| 2003/0028468 A1 | 2/2003 | Wong et al. | |
| 2003/0120939 A1 * | 6/2003 | Hughes et al. | 713/191 |
| 2003/0126435 A1 | 7/2003 | Mizell et al. | |
| 2004/0015582 A1 | 1/2004 | Pruthi | |
| 2006/0053156 A1 | 3/2006 | Kaushansky et al. | |

FOREIGN PATENT DOCUMENTS

| | | |
|---|---|---|
| GB | 2328043 A | 2/1999 |
| WO | WO 9702841 A3 | 7/1997 |
| WO | WO9822875 A1 | 5/1998 |
| WO | WO9927677 A1 | 6/1999 |
| WO | WO0011619 A | 3/2000 |
| WO | WO0107979 A | 2/2001 |
| WO | WO 0139435 A2 | 5/2001 |

OTHER PUBLICATIONS

Cisco, "Cisco 3200 Mobile Access Routers Product Literature," 2 pgs., Copyright 1992-2002 Cisco Systems, Inc. URL: http://www.cisco.com/warp/public/cc/pd/rt/ps272/prolit/index.shtml.

Alan O. Freier, et al., "The SSL Protocol, Version 3.0," Netscape Communications, Nov. 18, 1996, 47 pages URL: http://wp.netscape.com/eng/ss13/draft302.txt.

T. Dierks, et al. "The TSL Protocol, Version 1.0," Certicom, Jan. 1999, 57 pages URL: http://www.ieff.org/rfc/rfc2246.txt.

International Search Report from International Application No. PCT/US03/024319 dated Aug. 23, 2004.

Written Opinion from International Application No. PCT/US03/024319 dated Dec. 29, 2005.

Preliminary Examination Report from International Application No. PCT/US03/024319 dated Mar. 22, 2006.

Office Action from U.S. Appl. No. 10/215,768 dated Feb. 24, 2004.

Office Action from U.S. Appl. No. 10/215,768 dated Oct. 6, 2004.

Notice of Allowance from U.S. Appl. No. 10/215,768 dated Nov. 19, 2004.

Cisco, "Cisco 3200 Mobile Access Routers," 2 pgs, Copyright 1992-2002 Cisco Systems, Inc. URL: http://www.cisco.com/warp/public/cc/pd/rt/ps272/.

Freier, et al. "The SSL Protocol, Version 3.0," Transport Layer Security Network Group, Internet Draft, Nov. 18, 1996, 47 pages, Mt. View, CA URL: http://www.wp.netscape.com/eng/ss13/draft302.txt.

Arnold, et al., "An approach for the interoperation of web-distributed applications with a design model" Automation in Construction, Elsevier Science Publishers, Amsterdam, NL, vol. 8, No. 3, Feb. 1, 1999, pp. 291-303, XP004161221 ISSN: 0926-5805.

Berners-Lee, et al., "RFC 1866: Hypertext Markup Language—2.0", Nov. 1995.

Chou-Chen Yang et al., Cryptanalysis of Security Enhancement for the Timestamp-based Password Authentication Scheme Using Smart Cards, Consumer Electronics, IEEE Transactions on vol. 50, Issue 2, pp. 578-579, May 2004.

International Search Report from International Application No. PCT/US02/15163 dated Jul. 12, 2002.

Preliminary Examination Report from International Application No. PCT/US02/15163 dated Mar. 27, 2003.

International Search Report from International Application No. PCT/US02/15164 dated Jul. 12, 2002.

Preliminary Examination Report from International Application No. PCT/US02/15164 dated Feb. 26, 2004.

Geng-Sheng Kuo et al., "Predictable Timestamp Under Synchronized Clocks in a Network", Information Theory, 1994 Proceedings, p. 68, 1994 IEEE International Symposium, Jun. 27-Jul. 1, 1994.

Fielding, et al., "Hypertext Transfer Protocol—HTTP/1.1: HTTP Working Group Internet Draft", May 2, 1986.
Google Search—Definition "at the money".
Gray et al., "Data Cube: A Relational Aggregation Operator Generalizing Group by, Cross Tab, and Sub-Totals", Data Engineering, 1996, pp. 152-159.
http://www.aiai.ed.ac.uk/project/akt/work/jessicac/kit/server.pl.html.
http://www.javaworld.com/javaworld/jw-03-2000/jw-0331-ssj-jspxml13p.html.
Microsoft, Web Services Security Addendum, Version 1.0, Aug. 2002.
Pairceir et al., "Discovery of Multi-Level Rules and Exceptions From a Distributed Database", Proceedings of the sixth ACM SIGKDD International Conference on Knowledge Discovery and Data Mining, 2000, pp. 523-532.
Pei-Yin Ting, "A Temporal Order Resolution Algorythm in the Multi-Server Time Stamp Service Framework", Advanced Information Networking and Applications, AINA 2005, 19th Conference on vol. 2, pp. 445-448, Mar. 28-30, 2005.
PTI Trader's Glossary-A, Internet Waybackmachine, Apr. 26, 2001.
Spanos, "Statistical Foundations of Econometric Modelling", Cambridge University Press, 1986, pp. 7, 8, 18, 190, 131, 462.
W3C, Simple Object Access Protocol (SOAP) 1.1, May 2000.
Office Action from Israel Application No. 158911.
Office Action dated May 12, 2006 from Utility Patent No. 7451110.
Office Action dated Dec. 18, 2006 from Utility Patent No. 7451110.
Office Action dated Sep. 7, 2007 from Utility Patent No. 7451110.
Office Action dated Oct. 6, 2004 from Utility Patent No. 7124299.
Office Action dated Oct. 19, 2005 from Utility Patent No. 7124299.
Office Action dated Apr. 22, 2005 from Utility Patent No. 7124299.
Office Action dated Mar. 17, 2009 from Continuation U.S. Appl. No. 11/549,880.
Office Action dated Sep. 10, 2004 from Utility Patent No. 7039034.
Office Action dated May 24, 2005 from Utility Patent No. 7039034.
Office Action dated Oct. 30, 2008 from Continuation-in-Part U.S. Appl. No. 11/379,045.
Office Action dated Aug. 6, 2009 from Continuation-in-Part U.S. Appl. No. 11/379,045.
Office Action dated Feb. 24, 2004 from Utility Patent No. 6874089.
Office Action dated Oct. 6, 2004 from Utility Patent No. 6874089.
Office Action dated Jun. 24, 2008 from Continuation U.S. Appl. No. 10/977,399.
Office Action dated Mar. 17, 2009 from Continuation U.S. Appl. No. 10/977,399.
Office Action dated Jul. 22, 2008 from Continuation-in-Part U.S. Appl. No. 11/059,908.
Office Action dated Apr. 1, 2009 from Continuation-in-Part U.S. Appl. No. 11/059,908.
Office Action dated Nov. 2, 2004 from Utility Patent No. 7464154.
Office Action dated Jun. 2, 2005 from Utility Patent No. 7464154.
Office Action dated Jan. 18, 2006 from Utility Patent No. 7464154.
Office Action dated Sep. 13, 2006 from Utility Patent No. 7464154.
Office Action dated May 21, 2007 from Utility Patent No. 7464154.
Office Action dated Feb. 2, 2009 from Canadian Patent Application No. 2,446,753.
Office Action dated Jan. 4, 2007 from Indian Patent Application No. 487/DELNP/2005.
Office Action dated Jun. 2, 2009 from Israel Patent Application No. 166660.
Supplemental Search Report dated Jun. 2, 2009 from European Patent Application No. 02729199.6.
Office Action dated Oct. 9, 2008 from European Patent Application No. 02771835.2.
Vasudevan, A Web Services Primer, Apr. 4, 2001, XML.com, p. 3.
Final Office Action mailed Dec. 14, 2009 from U.S. Appl. No. 11/549,880.
Final Office Action mailed Jan. 6, 2010 from U.S. Appl. No. 11/059,908.
Office Action mailed Mar. 25, 2010 from U.S. Appl. No. 11/379,045.
European Search Report mailed May 18, 2010 from European Patent Application No. 03784894.2.

* cited by examiner

SYSTEM, METHOD AND COMPUTER PROGRAM PRODUCT FOR GUARANTEEING ELECTRONIC TRANSACTIONS

CROSS-REFERENCE TO RELATED APPLICATION

This application is a continuation of U.S. patent application Ser. No. 10/215,768, filed Aug. 9, 2002 now U.S. Pat. No. 6,874,089, which claims the benefit of U.S. Provisional Application No. 60/359,579 filed Feb. 25, 2002, and hereby incorporates by reference both of these applications.

FIELD OF THE INVENTION

This invention relates to electronic transactions, and more particularly, relates to guaranteeing electronic transactions.

BACKGROUND OF THE INVENTION

As the number of business-to-consumer (B2C) and business-to-business (B2B) transactions increases, the issue of guaranteeing e-commerce becomes more and more acute. The current state of the art is authenticating the identity of both parties to prevent attackers from fraudulently taking action on behalf of one party and then encrypting their communication to prevent attackers from observing confidential information. Typically, either the Secure Sockets Layer (SSL) protocol or the Transport Layer Security (TLS) protocol may provide a mechanism for authentication and encryption. These protocols are nearly identical, so one can treat them as the same protocol for the purpose of analyzing their use in e-commerce. The party controlling the server authenticates itself using the protocol's required certificate-based mechanism and the party controlling the client authenticates itself using either a password-based mechanism provided by the application layer or the protocol's certificate-based client mechanism. However, this popular approach does not resolve disputes over the content of a transaction between two parties.

E-Commerce Disputes

Consider possible B2C and B2B disputes. In a B2C transaction, a consumer uses an online trading service to make a stock trade. When the consumer receives a statement from the service, the consumer may call the trading service and dispute the number of shares traded. A big enough difference between the share price at the time of trade and the time of dispute could leave the trading service open to a significant liability. In a B2B transaction, a distributor uses an online purchasing system to order a large volume of a manufacture-to-order part from a supplier. Upon receiving the part, he calls the supplier and complains that the supplier sent him the wrong type of part. If this part is expensive enough to manufacture, the supplier could be open to a significant liability.

The authentication features of existing e-commerce applications offer little or no help. Neither party disputes whether a transaction took place. They dispute the correctness of the transaction and who should bear the cost of remediation. The potential for such costly disputes exist in vertical industries that make heavy use Internet technologies such as finance, retail, and logistics. Popular classes of horizontal applications such as procurement, supply chain management, and Web services are also vulnerable. In most cases, applications in these vertical industries and horizontal categories provide some sort of a receipt. But this document is simply clear data describing the terms of the transaction and providing a key for retrieving the transaction record from the issuer's back office systems. Any security properties attached to this document disappeared as soon as the SSL/TLS connection terminated. Because the receiving party can easily alter this document and the issuing party can easily change the contents of its internal systems, it may be very difficult to validate such types of receipts during a dispute.

Drawbacks of Cryptographic Signatures

A typical security approach for e-commerce to solving this problem is to have each party cryptographically sign the transaction messages he sends to the other party. This approach has three significant drawbacks. First, for existing applications this approach may require a complete redeployment of software with new message signing features. Second, this approach may require that both parties have signing-capable software, a major challenge for B2C commerce where one of the parties is a consumer or B2B commerce where one of the parties is a small business. What good is a cryptographically signed receipt if the recipient has no way to verify its authenticity? Third, this approach may impose a substantial cost on application operators in terms of new software, developer training and public key infrastructure. In some cases, it might also require additional hardware to offset the performance impact.

SUMMARY OF THE INVENTION

A system, method and computer program product for guaranteeing a data transaction over a network are disclosed. When a data transaction between at least a server and a client is detected on a network, data transmitted via the network between the server and client during the data transaction is captured. At least one identifier is associated with the captured data. A timestamp is also generated for the captured data. The timestamp includes information therein identifying at least a portion of the identifier(s). The captured data, the identifier(s) and the timestamp are stored in one or more data stores. The identifier(s) associated with the stored captured data is also mapped to an entry in an index to permit retrieval of the stored data from the data store via the index.

In an aspect of the present invention, the data transmitted during the data transaction may be encrypted by the source utilizing a session secret (e.g., a master secret) negotiated between the server and the client. As an option, the captured data may subsequently be retrieved from the data store utilizing the entry in the index. A portion of the captured data may then be submitted to the server or client to obtain at least the session secret from the server or client with which the captured data may be decrypted. As a further option, the data received by the server or the client during the data transaction may then be compared with the decrypted captured data to determine if data received by the server or the client matches the decrypted captured data and thereby determined to be an uncorrupted copy of the data.

As another option, encrypted keying material may be presented for revelation to at least one of the server and the client. In such an embodiment, the revelation of the encrypted keying material may be added to a secure audit trail before revelation. As a further option, the encrypted keying material may be re-encrypted for a trusted mediator which securely logs revelation before revealing the encrypted keying material to a replaying entity. As an additional option, the trusted mediator may authenticate a challenge provided by the server or the client and in which the server or the client verifies that authenticator before the replaying peer decrypts the encrypted keying material. In such an embodiment, the trusted mediator may reduce the encrypted keying material into traffic keys before revealing to the replaying entity.

In another aspect of the present invention, the captured data and the identifier(s) may be stored in a first data store and the timestamp stored in a second data store. In a further aspect, the network may also include a wireless network. In an additional aspect, the data transmitted during the data transaction may be encrypted by the server and the client utilizing a secure sockets layer (SSL) protocol and/or a transport layer security (TLS) protocol. In yet another aspect, the timestamp may be generated utilizing a remote time source coupled to the network. In even another aspect, the timestamp may include a digital signature.

In one aspect of the present invention, a first device coupled to the network may capture the data and associate the at least one identifier to the captured data while a second device coupled to the network generates the timestamp for the captured data. In such an aspect, the second device may transmit the timestamp to the first device via the network. In yet another embodiment of the present invention, the captured data may be hashed, with the hash being stored instead of the captured data. As a further option, the hash may then be compared to a hash of a version of the data for the same data transaction captured at another location between the server and the client to verify the authenticity and/or integrity of the captured data.

DETAILED DESCRIPTION

The present invention provide an approach that may have little if no impact on existing applications and does not require a priori cooperation of both parties. Moreover, it can cost significantly less than message signing. Because SSL/TLS protected channels offer a combination of authentication, confidentiality, and integrity, it is possible to record the SSL/TLS traffic and uses this record to later demonstrate what actually occurred. By carefully constructing a device-based system and making small changes to SSL/TLS server implementations, it is possible to make this demonstration secure in the sense that neither party could retroactively cheat the system. Furthermore, it would be extremely difficult to cheat the system even if one of the parties planned to do so from the beginning.

This approach does not supplant cryptographic signatures in cases where strong non-repudiation is necessary, such as signing a contract. In these cases, the parties want to explicitly agree to a set of facts, rather than implicitly agree to what occurred during a process. But it in no way interferes with such uses of cryptographic signatures either. Because signatures occur at the message level, they are orthogonal to channel security. So an enterprise could maintain a limited set of signature-capable software and accompanying public key infrastructure for those select cases where they are necessary but rely on the dispute resolution appliance for the far larger percentage of circumstances where it is appropriate.

Figure 1:
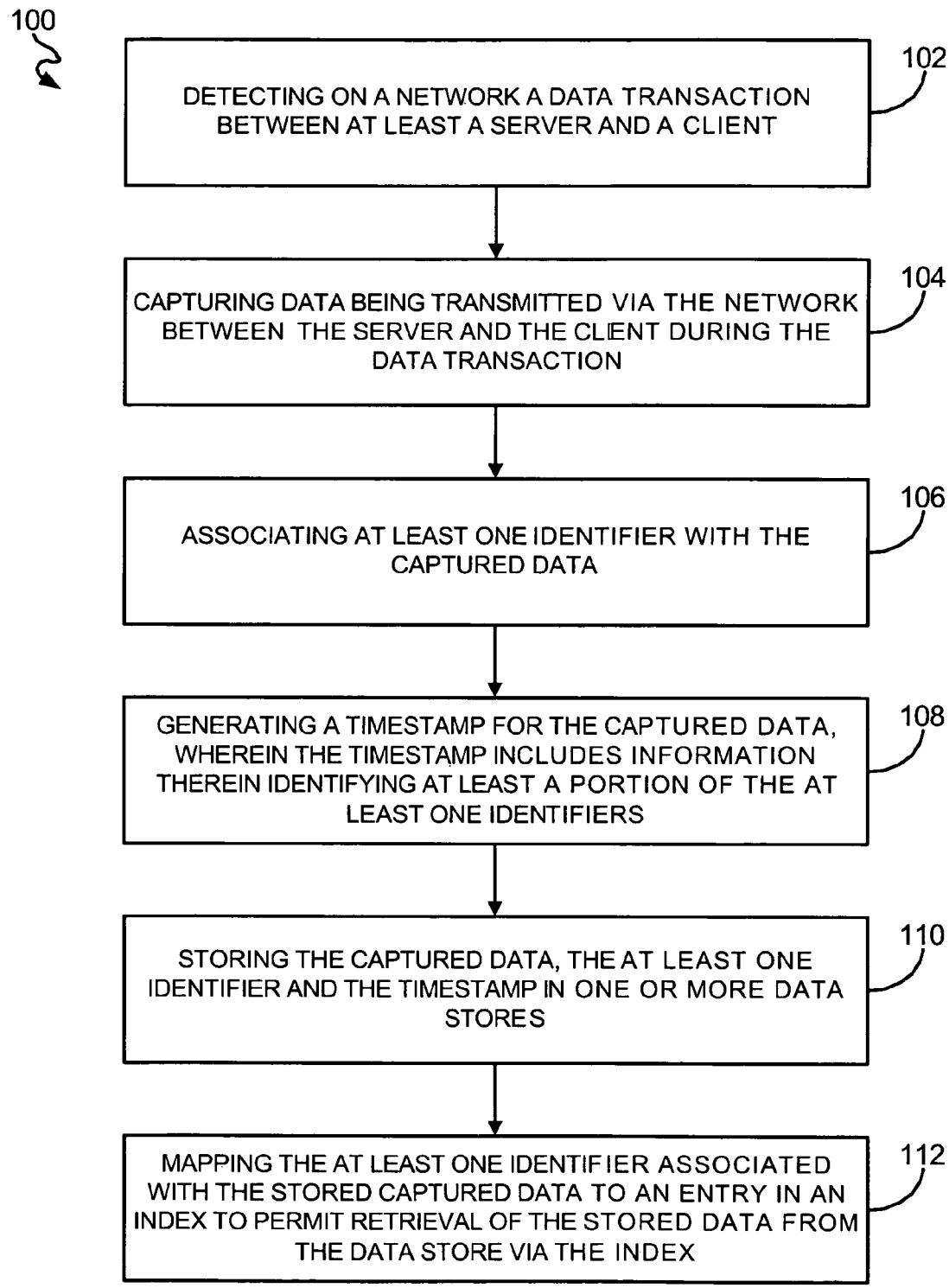
FIG. 1 is a flowchart of a process for guaranteeing a data transaction over a network in accordance with an embodiment of the present invention.

FIG. 1 is a flowchart of a process 100 for guaranteeing a data transaction over a network are disclosed. When a data transaction between at least a server and a client is detected on a network in operation 102, data transmitted via the network between the server and client during the data transaction is captured in operation 104. At least one identifier is associated with the captured data in operation 106. A timestamp is also generated for the captured data in operation 108. The timestamp includes information therein identifying at least a portion of the identifier(s). The captured data, the identifier(s) and the timestamp are stored in one or more data stores in operation 110. The identifier(s) associated with the stored captured data is also mapped to an entry in an index in operation 112 to permit retrieval of the stored data from the data store via the index.

In an aspect of the present invention, the data transmitted during the data transaction may be encrypted by the source utilizing a session secret (e.g., a master secret) negotiated between the server and the client. As an option, the captured data may subsequently be retrieved from the data store utilizing the entry in the index. A portion of the captured data may then be submitted to the server or client to obtain at least the session secret from the server or client with which the captured data may be decrypted. As a further option, the data received by the server or the client during the data transaction may then be compared with the decrypted captured data to determine if data received by the server or the client matches the decrypted captured data and thereby determined to be an uncorrupted copy of the data.

As another option, encrypted keying material may be presented for revelation to at least one of the server and the client. In such an embodiment, the revelation of the encrypted keying material may be added to a secure audit trail before revelation. As a further option, the encrypted keying material may be re-encrypted for a trusted mediator which securely logs revelation before revealing the encrypted keying material to a replaying entity. As an additional option, the trusted mediator may authenticate a challenge provided by the server or the client and in which the server or the client verifies that authenticator before the replaying peer decrypts the encrypted keying material. In such an embodiment, the trusted mediator may reduce the encrypted keying material into traffic keys before revealing to the replaying entity.

In another aspect of the present invention, the captured data and the identifier(s) may be stored in a first data store and the timestamp stored in a second data store. In a further aspect, the network may also include a wireless network. In an additional aspect, the data transmitted during the data transaction may be encrypted by the server and the client utilizing a secure sockets layer (SSL) protocol and/or a transport layer security (TLS) protocol. In yet another aspect, the timestamp may be generated utilizing a remote time source coupled to the network. In even another aspect, the timestamp may include a digital signature.

In one aspect of the present invention, a first device coupled to the network may capture the data and associate the at least one identifier to the captured data while a second device coupled to the network generates the timestamp for the captured data. In such an aspect, the second device may transmit the timestamp to the first device via the network. In yet another embodiment of the present invention, the captured data may be hashed, with the hash being stored instead of the captured data. As a further option, the hash may then be compared to a hash of a version of the data for the same data transaction captured at another location between the server and the client to verify the authenticity and/or integrity of the captured data.

System Architecture

Figure 2:
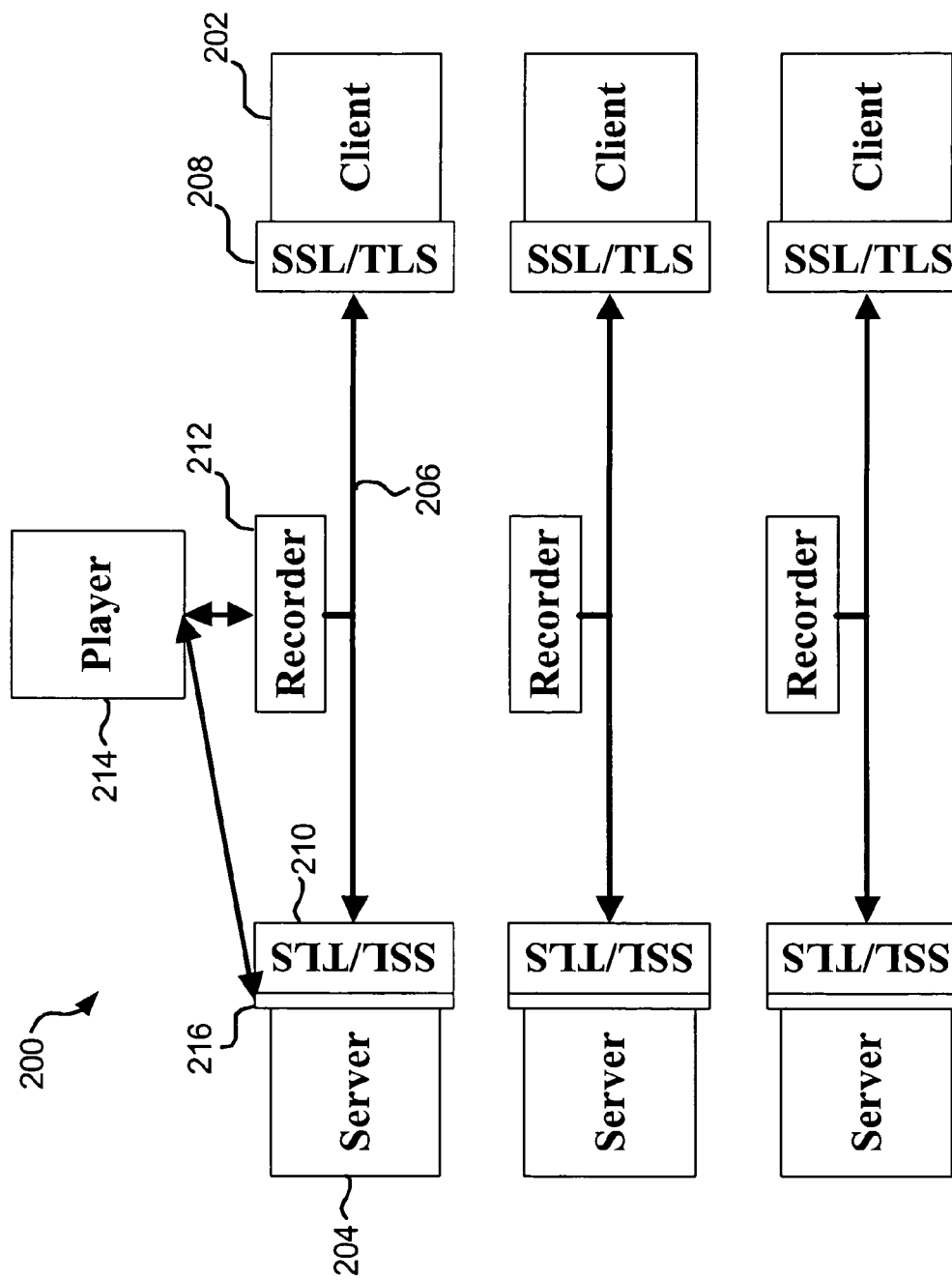
FIG. 2 is schematic block diagram of an architecture for a device-based e-commerce guarantee system in accordance with an embodiment of the invention.

FIG. 2 is schematic block diagram of an architecture for a device-based e-commerce guarantee system 200 in accordance with an embodiment of the invention. Each e-commerce transaction has two endpoints 202, 204 communicating over an SSL/TLS-protected channel 206 (i.e., a network channel). The endpoints may be, for example, a Web browser 204 and a Web server exchanging HTML over HTTPS, two application servers exchanging SOAP messages over HTTPS, or any two nodes exchanging application messages over a TCP/IP connection protected by SSL/TLS. From the perspective of SSL/TLS, one of the endpoints is the client 202 and one is the server 204, so we shall use this terminology regardless of the logical relationships between the two endpoints. Each client and server has its own SSL/TLS implementation 208, 210. In certain cases, the server SSL/TLS implementation 210 may be an independent layer of SSL/TLS appliances.

Providing device-based guarantees within this generic e-commerce model may involve adding two new components and making small changes to one existing component. An array of Recorder devices 212 captures all of the encrypted SSL/TLS traffic of interest between the two parties and saves it to non-volatile media. When a dispute arises, Player software 214 retrieves the session in question from a Recorder device and replays the session. Playing archived sessions may require assistance from the server SSL/TLS implementation 210, so these implementations may also include a few modifications. In its most basic form, using the device-based e-commerce guarantee system utilizes the following process:

1. Deploy Recorders. Either party may deploy recorder devices along their mutual network path. In most cases, the server party offers the e-commerce guarantee as a customer satisfaction feature so it will usually be responsible for deploying Recorders. Light SSL/TLS traffic may require a single Recorder at the boundary between the external and internal network. Heavier SSL/TLS traffic may require an array of Recorders within a load-balanced network. The deploying party may reduce the load on Recorders by configuring them to capture only SSL/TLS sessions deemed "important", using such criteria as server address, server port number, and client subnet.

2. Enable SSL/TLS implementations. For the system to work, the SSL/TLS implementations of the server party need some special features 216. They may offer a function to retrieve information from the session handshake and a function for archiving special session information from certain SSL/TLS modes. Embedded, appliance, and software SSL/TLS implementations can easily accommodate these changes. Embedded and appliance implementations may offer an additional level of fraud protection through tamper proofing measures that prevent the disclosure of their private keys.

3. Capture Transactions. The parties conduct e-commerce transactions as they usually do, using SSL/TLS over their connecting network path. The Recorder saves all of the designated SSL/TLS sessions, secure timestamp, and indexing information to either local media or a storage attached network (SAN). To facilitate searching for a particular transaction in the future, the Recorder can send the index information to a central location such as a database.

4. Retrieve Transactions. The Player uses the session index to identify the location of the archived session, corresponding timestamps, and the SSL/TLS instance that served the session. The Player retrieves the archived session and timestamps. The Player then submits the handshake portion of the session to the SSL/TLS instance to retrieve the necessary session secret and any special session information.

5. Play Transactions. The Player uses the session secret from the SSL/TLS instance to decrypt the archived session. The parties then compare the disputed information to the contents of the decrypted archive.

Using this process, the parties to a dispute can "go to the replay" to see what actually happened. The secure timestamp assures that the party controlling the recorder doesn't fake its own version of the session at some later date. The message integrity of SSL/TLS, the protection of the server's private key, and the digital signatures on the timestamps protect the system from fraud. The rest of this section details the properties of the Recorder, SSL/TLS implementation, and Player necessary to provide these assurances.

Recorder

Figure 3:
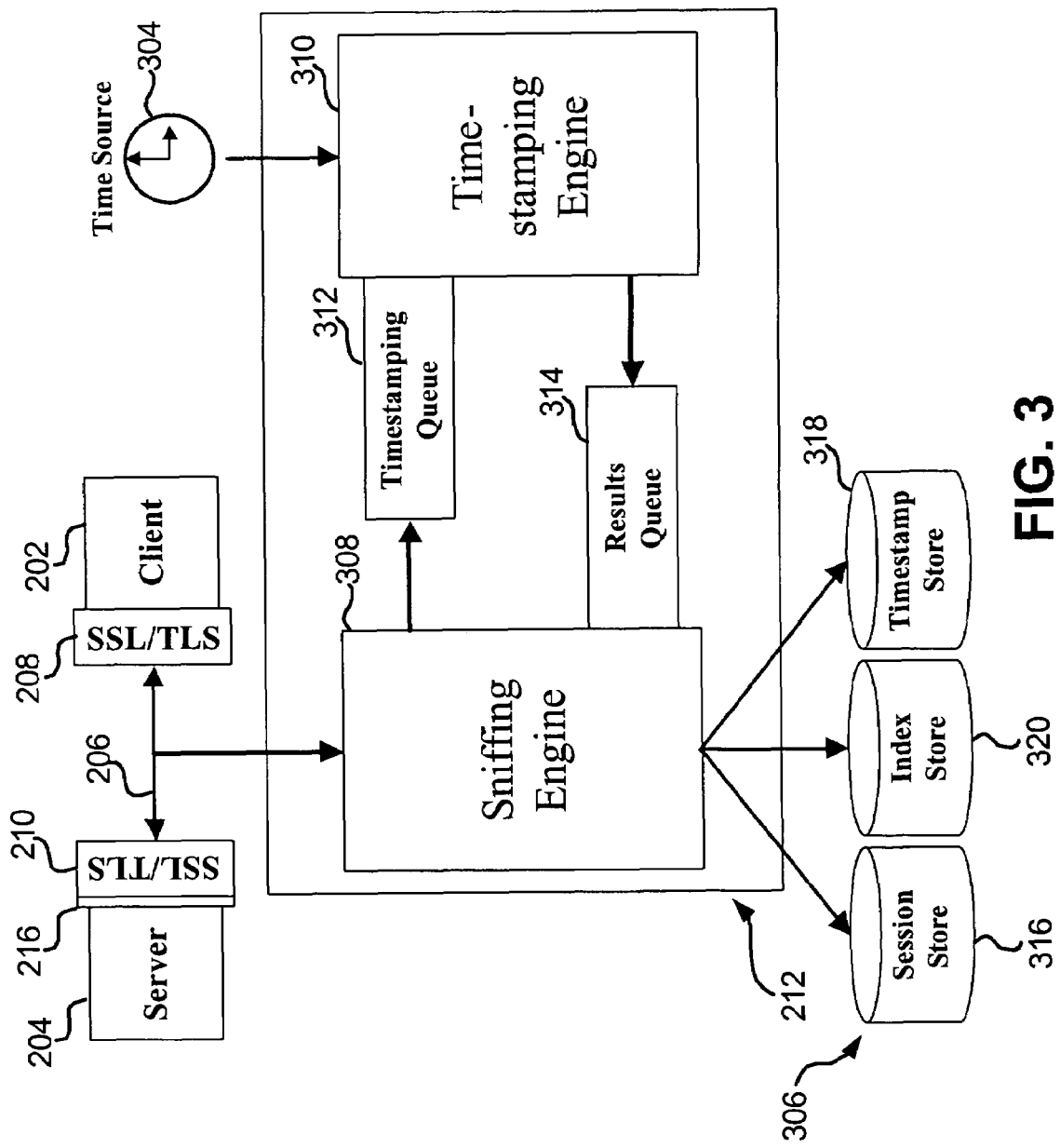
FIG. 3 is a schematic block diagram of a Recorder in accordance with an embodiment of the invention.

FIG. 3 is a schematic block diagram of a Recorder 212 in accordance with an embodiment of the invention. Recorders 212 may be general-purpose computers in tamper evident or tamper resistant chassis. Each one has at least one network interface 302, a reliable time source 304, and at least one storage medium 306 such as a local hard disk. For storage management, they may also have tertiary storage devices such as tape drives or DVD-RAM drives, external interfaces such as SCSI or IEEE 1394 for connecting to storage arrays, or additional network interfaces for connecting to SANs. They may also have hardware cryptographic accelerators to speed the signing functions used in timestamping. Because the integrity of recorded sessions relies only on the physical security of the timestamping engine, the entire Recorder need not be tamper proof. Executing the timestamping engine on a separate, tamper proof module within the Recorder device would provide the same level of security.

Recorders 212 are promiscuous devices that can examine all traffic passing over the network link. As FIG. 3 shows, the Recorder 212 has two separate internal software components:

a sniffing engine 308 for capturing SSL/TLS data and a timestamping engine 310 for creating secure timestamps of this data. Between the sniffing engine and the timestamping engine, the Recorder 212 also has a timestamping queue 312 and a results queue 314.

Figure 4:
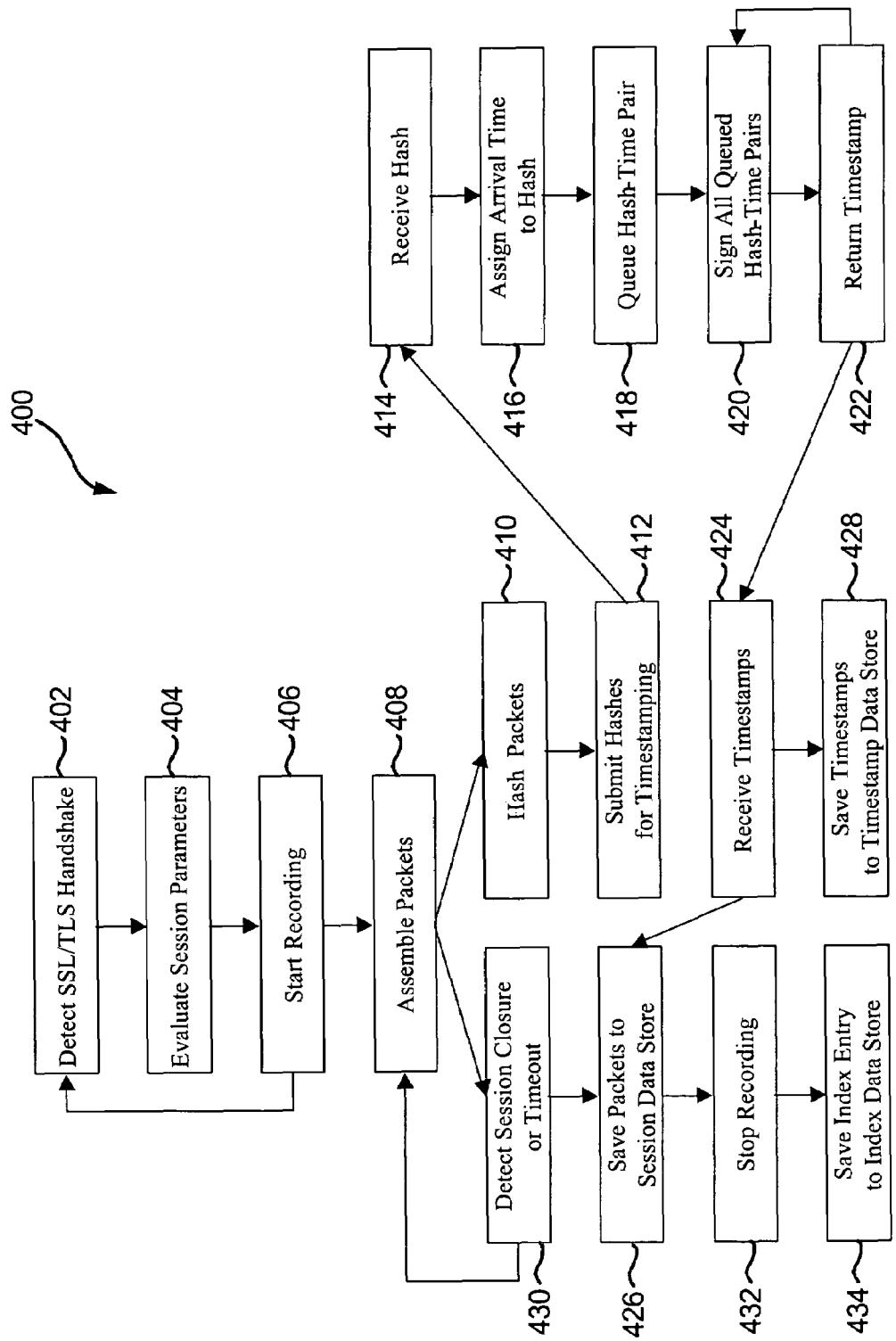
FIG. 4 is a flowchart of a process executed by the sniffing and timestamping engines in accordance with an embodiment of the invention.

FIG. 4 is a flowchart of a process 400 executed by the sniffing and timestamping engines. When the sniffing engine 308 detects an SSL/TLS handshake in operation 402, it evaluates the session to determine whether it should begin recording (see operations 404 and 406). The sniffing engine 308 maintains a configuration file that specifies how to make this determination. The configuration parameters include at least the server address, server port number, and client subnet. The configuration parameters may also include any of the information in server or client certificates. If an SSL/TLS session meet the required criteria, then the sniffing engine begins assembling the corresponding TCP packets in operation 408.

As the sniffing engine reassembles TCP data streams from different SSL/TLS sessions, it submits hashes of valid packet sequences to the timestamping engine in operation 410. As the timestamping engine receives these hashes, it assigns them an arrival time and puts them in the timestamping queue 312 (see operations 412-416). When the timestamping engine becomes free, it pulls all the hash-time pairs from this queue up to a set maximum, timestamps them as a single unit, and returns the timestamp to the results queue 314 (see operations 418-424). Several types of serial numbers help match session and timestamping data, as well as prevent attacks that involve reordering data. Each SSL/TLS session has a serial number assigned by the sniffing engine when it begins recording, each packet sequence has a serial number assigned by the sniffing engine when it assembles the sequence, each packet sequence hash has a serial number assigned by the timestamping engine when it receives the hash, and each timestamp has a serial number assigned by the timestamping engine when it performs the signature. Each type of serial number is included in at least one timestamp to prevent them from being altered. As timestamps return from the timestamping engine, the sniffing engine saves the corresponding packet sequences and associated serial numbers to the session data store 316 in operation 426. Because timestamps may include packet sequences from different sessions, the sniffing engine saves them in a separate timestamp data store 318 in operation 428. When the session terminates or times out (see operations 430 and 432), the sniffing engine also creates an index entry mapping the session serial number to metadata that will facilitate retrieving a desired session in the future. This metadata includes at least the time, client address, server address, SSL/TLS server_random value, SSL/TLS client_random value, and SSL/TLS session ID. Items such as the session duration, number of bytes, cryptosuite, server certificate fields, and client certificate fields can also be useful. The sniffing engine saves this index entry in an index data store 320 (see operation 434). The sniffing engine may also send this index entry to a central repository such as a file in a network file system or a table in a database.

To perform timestamps, the timestamping engine may require a reliable time source. Preferably, the time source should have access to a factory set internal time source with a known maximum of slip. This approach suffices for a time resolution of days. For resolutions of hours to minutes, an external time source may be needed. A recommended time source may be, for example, a peripheral card with either a radio clock tuned to standard government time frequencies or a connection to a GPS receiver. Another suitable option may be a specially hardened connection to a reliable time server operated by a trusted third party. In a preferred embodiment the NTP standard may be insufficiently secure by itself to prevent tampering. However, NTP over IPSEC provides an adequate level of information security, but the physical connection between the time server and the timestamping engine remains vulnerable.

Throughput of cryptographically intensive operations like timestamping is often an issue. For timestamping, the parties would like the best possible time resolution of when data arrived. However, individually signing every packet on a busy link is often impractical for high loads without hardware acceleration. The timestamping engine therefore aggregates signatures over multiple packets. As the sniffing engine assembles TCP packets it generates runs of sequential packets. It opportunistically hashes these runs as they become valid and submits them to the timestamping queue, which then pairs each packet sequence hash with its arrival time. When the timestamping engine becomes available, it signs all such hash-time pairs in the queue. Because each hash has an individual arrival time, the timestamping engine can maintain high throughput without losing time resolution.

This process automatically adapts to variable loads. If the timestamping engine is under light load, it might sign each hash-time pair. Under heavy load, it might sign large numbers of pairs at the same time. In both cases, the inclusion of the arrival time with each hash preserves a very fine time resolution. Even under very heavy peak loads, this approach still preserves arrival times and sequencing. Consider what happens if the sniffing engine simultaneous records two sessions, A and B. Packets arrive interleaved A2, B1, A4, B2, B3, A5, B4, A1, B5, A3. This generates four separate hashes: (B1, B2, B3), (A1, A2), (B4, B5), and (A3, A4, A5). As these hashes come in, the timestamping engine matches them to their time of arrival. If all these hash-time pairs are in the timestamping queue when the timestamping engine becomes available, it will sign them together. Even if several seconds have passed since the last signing, the process preserves the arrival order of packets sequences. As RSA signature times on modern processors are generally less than 20 ms, signatures usually occur at least once every second even under heavy loads. Of course, Recorders with faster processors or cryptographic acceleration can achieve substantially shorter timestamping windows.

Besides timestamp throughput, the other performance consideration is session storage. For session storage, throughput is probably not an issue. A 320 MB/s SCSI array can handle links of 2.5 Gb/s. Rather, the issue is the amount of storage. Even a relatively slow T1 produces almost 20 GB of sessions per day if saturated. But in B2C application, most of the network traffic is unsecured catalog viewing as opposed to secure purchasing. Web-based B2B applications mirror the characteristics of B2C applications while the traffic in messaging-based B2B applications is simply not very high. Certainly, large installations will involve moving old data to tape, but maintaining a month or two of archives on disk should be cost-effective in most cases, especially with SANs.

SSL and TLS incorporate a feature called session resumption that allows the client and server to reuse the Master Secret exchanged in a previous connection to secure a new connection. This feature provides a substantial performance improvement but presents a challenge for session replay because a resumed connection is not self-contained. Decrypting a resumed connection may involves first decrypting the original connection to recover the Master Secret.

Decrypting every connection in the session data store solves this problem through brute force. But this approach is too slow and reveals too much data. Identifying the "session head", the connection that established the session, and decrypting only that the session head avoids these drawbacks. It is easy to determine whether a given connection belongs to a particular session because the session ID appears in the clear in the SSL/TLS ServerHello message, thus may require no access to the server's private key. The session head always appears first and is distinguishable from other connections because a key is actually be exchanged. But a linear search through the session data store for the session head is too slow. Therefore, either the Recorder or the Player may maintain a database of session IDs and their corresponding session heads. The Recorder can generate database entries in real time as it detects new connections. Either the Recorder or Player can generate database entries in batch by periodically scanning all connections recorded since the last scan. This database contains two types of data: the IDREC is the session head index keyed by session ID and the HEADREC is the session head index keyed by connection ID.

Whenever the component maintaining session database detects a new connection, it first determines whether or not it's a session head. If it's a session head, the sniffing engine makes an IDREC entry with the connection ID and session ID. If it's a resumed session, the sniffing engine first identifies the corresponding session head by searching for the connection ID in the IDREC index using the known session ID. The sniffing engine then makes a HEADREC entry that contains the connection ID of the resumed session and the connection ID of its corresponding session head; The HEADREC index is not strictly necessary, simply a convenience. With only the IDREC, the Player would not know which session head to play until it had already started to process the desired connection. The HEADREC index allows it to first play the session and then the target connection in strict sequence.

SSL/TLS Implementation

Because the cryptographic keys held by the endpoints are the anchors for establishing secure sessions, the guarantee system may also need the cooperation of at least one endpoint's SSL/TLS implementation to decrypt archived sessions. The trick is to achieve this cooperation for dispute resolution without compromising the security of future transactions handled by the implementation. Enabling session replay involves the following changes to the server SSL/TLS implementations:

1. Private Key Storage. Because a server's private key demonstrates that it participated in a transaction, revealing its private key, even to an administrator can potentially compromise the validity of future session recordings. Therefore, a certified SSL/TLS implementation should take strict measures to protect its private key. In the case of software implementations, these measures should include the suppression of both application level and operating system level features that would enable the remote export of the key file. Unfortunately, with software implementations running on physically unhardened machines, it is virtually impossible to prevent an administrator with physical access to the server from accessing the key file. However, with a dedicated SSL/TLS network device, it is possible to achieve this level of assurance by eliminating external access to the file and including tamper evident seals on the box. Similarly, card-level and chip-level implementations can store their private keys in tamper-resistant modules and refuse to reveal them. Of course, this raises an issue if an administrator needs to change the server's private key. Therefore, the SSL/TLS implementation may also maintain a secure history of all its private keys and the time periods during which each was valid.

2. Archival. Ephemeral RSA and Diffie-Hellman SSL/TLS modes present a challenge for future playback of transactions because the keys change throughout the session. Therefore, SSL/TLS implementations that allow these modes may archive additional information that will allow the Player to recreate the plaintext from SSL/TLS sessions that use these modes. The most straightforward approach involves the implementation to save a copy of every key used during each session. In some cases, the amount of data may make this approach undesirable. A more sophisticated approach is for the implementation to save the state of the random number generator used to create new keys at the beginning of each session. Luckily, the use of ephemeral RSA and Diffie-Hellman is rather rare, so neither of these archival approaches will be necessary in the vast number of cases.

3. Revelation Function. To decode archived session, the guarantee system may recover handshake information encrypted under the server's public key. In production deployments, the server cannot simply reveal its private key to facilitate this recovery. So SSL/TLS implementations may include special revelation functions. Given encrypted portion of the SSL/TLS handshake, they may be able to provide the master secret (MS). Adding this functionality to an existing software or hardware implementation is fairly straightforward because almost all implementations use a well-known format for key files such as PEM or PKCS-12. Therefore, adding the revelation function is a simple matter of installing an independent server program that reads this file and decrypts the handshake. This server program may include access control features to restrict the use of the function to authorized parties.

SSL/TLS implementations may be software libraries, hardware accelerator devices, or embedded hardware. In either case, the manufacturer of the transaction guarantee system may certify which implementations can work with the system.

Player

The Player is basically a specialized SSL/TLS implementation. It lacks the functionality to initiate and maintain a real-time SSL/TLS session. It has the additional functionality to play a previously recorded session. The Player software could run as a desktop application or a Web application. It simply may require the session serial number, access to the desired session archive and corresponding timestamp archive, and a connection to the server whose SSL/TLS implementation processed the session. The Player can get the session serial number by performing a search using the session index. In most cases, the parties will have an approximate transaction time and know the potential IP addresses for the client. This information should narrow down the candidate sessions to a manageable level. With small changes, application software running on the server could also retrieve the SSL/TLS server_random, client_random, or session ID used during a transaction and pass it on to backend applications. These backend applications would then have a link from the transaction data to one of these random values, which uniquely identifies the SSL/TLS session.

For desktop applications, the user interface and replay engine run on the same machine. For a Web application, the user interface runs on a Web browser while the replay engine runs on a server with an HTTP interface. This portal-based approach offers two advantages. First, it centralizes the administration over who has authorization to replay transactions. Second, it provides a natural focal point for maintaining the index entries for all session archives and the functionality for searching through them. An enterprise could manage its own Web application Player or outsource it to a third party. The third party model may decrease costs and increase customer trust.

The Player is actually two separate software components. The first component decrypts the SSL/TLS data into plain text. It retrieves the session data from the session archive and the timestamp data from the timestamp archive. It verifies the cryptographic signatures on the timestamps and checks all the serial numbers. It then submits the handshake portion of the session to the SSL/TLS implementation that handled the session to get the MS. Finally, it uses the MS to decrypt the session. The second component interprets this data from the application perspective. Given the relative popularity of Internet protocols, a basic Player may be able to interpret HTTP traffic and further display HTML pages or SOAP messages. An advanced Player could interpret all types of protocols and message types. It could even include a workflow engine that enforces a rigorous verification process.

The revelation functions of SSL/TLS implementations expose very useful information, both for legitimate arbitration and potential attacks. The revelation function may prevent the release of session secrets to unauthorized parties. The most direct approach would be for the revelation function to protect its connection to the Player using SSL/TLS, authenticate the party performing the arbitration with either a password or SSL/TLS client authentication, and compare his identity to an access control list of authorized parties. However, because the SSL/TLS implementation may not run on a physically hardened machine, this access control list could be somewhat vulnerable to manipulation. Also, it may be possible for an attacker with legitimate access to the Player to use revealed session secrets to subsequently perpetrate a proactive fraud.

Therefore, the e-commerce guarantee system uses the physically hardened Recorder as the point of control for revelation. When a Player requests the revelation of a session secret, the revelation function on the SSL/TLS implementation sends back a random value. The Player then submits this random value to the Recorder, which signs it under its private key after comparing the Player party credentials to its securely maintained access control list. When the Player sends this signed random value back to the revelation function, verifying the Recorder's signature establishes an authorized revelation. The revelation function then reveals the PreMaster Secret, but only after encrypting it under the Recorder's public key. The Player may send this encrypted PreMaster Secret back to the Recorder for decryption. The Recorder returns the traffic keys for the connection in question. The reason for going back to the Recorder is so that it can securely log the revelation along with information about the particular revealed session, enabling detection of the future use of the session secret in a proactive fraud. In accordance with an embodiment of the present invention, returning the traffic keys rather than the PreMaster Secret or Master Secret may help to limit the scope of any proactive fraud to the target connection as opposed to the SSL/TLS session, thus protecting the security of other connections in the same session which remain active while the target connection is being replayed. Note that the initial exchange of random value and signed random value to authorize revelation isn't strictly necessary. The revelation function could theoretically reveal the session secret of any session to any party, as long as it encrypted the session secret under the Recorder's public key and the Recorder performed access control checking before revealing the traffic keys. But this extra step provides psychological comfort because session secrets, even encrypted ones, aren't floating around the network. As an added security precaution, computers running the Player could be required to maintain authentication credentials and perform authentication operations in a special tamper proof module. This approach enables the vendor of the system to limit the organizations that can play transactions and issue them such a module only if they meet certain criteria.

Security Benefits

The three parts of the device-based e-commerce guarantee system may work together to deliver a securely verifiable audit trail of transactions over SSL/TLS. The architecture of the system is designed to prevent attackers from compromising the validity of the audit trail. There are three potential classes of attack considered in the threat model:

1. Reactive Fraud. In this threat class, one of the parties to the transaction attempts to defraud the audit system after the dispute occurs in order to cover up its culpability. The only party capable of mounting such an attack is the one that controls the network segment on which the Recorder resides. That party is the only one with network and physical access to the Recorder devices. Because SSL/TLS provides message integrity, there is no way to alter the archived session to reflect an alternative outcome without invalidating the archived session. So the attacker may delete the old session and arrange for the recorder to capture an alternative version of the session. The secure timestamping feature of the Recorder may prevent this attack in two ways in accordance with embodiments of the present invention. First, deleting the original session will cause an easily detected gap in the sequence numbers included in the timestamps. Second, as long as a significant amount of time passes between the time of the transaction and the time of the dispute, the alternative version of the session will have a timestamp with a time much later than the actual transaction in question. If the attacker attempts to overcome this issue by rolling back the Recorder's clock, the attacker will violate the device's physical tamper proofing.

2. Proactive Fraud. In this threat class, one of the parties plans beforehand to defraud the audit system. This class would also include frauds that are conceptually reactive but that the attacker attempts to perpetrate very soon after the transaction occurs. As with reactive fraud, the only party capable of mounting such an attack is the one that controls the network segment on which the Recorder resides. If the other party uses a password managed by the attacking party's server, the attack will succeed. Because the attacking party can access the password, it can instantiate a fraudulent session at the same time as the legitimate session, pose as the other party during this session, and make it appear the other party did anything. If the other party uses SSL/TLS client authentication, the situation becomes more complicated. Theoretically, if the attacking party compromised the server's SSL/TLS implementation and has sufficiently powerful computing resources, it can gather protocol information from the legitimate session and forward it to another computer that can use this information to pose as the other party.

3. Denial of Service. In this threat class, one party simply attempts to eliminate archived sessions to prevent verification of its culpability. If the attacker attempts to delete specific recorded sessions, the break in serial numbers will give him away. But it does not bring the missing session back. Preventing the loss of sessions is impossible through technical means for a party with physical access to the Recorders or server SSL/TLS implementations. Conceptually, the attacker can simply smash them with a hammer. More subtle attacks in this class include severing a Recorder's network connection or deleting a server's key store. However, there are social, economic, and legal limitations to this attack. First, if the attacking party starts to lose a lot of disputed sessions, it will look pretty suspicious and a more traditional investigation will ensue. Second, the attacking party has to invest a considerable amount of money in the guarantee systems and repeated failures to resolve disputes will waste this investment in customer satisfaction. Third, the owner of the Recorders and servers can commit to being a good citizen with a policy of, "If we can't replay the session, you automatically win the dispute."

The goal of the system is not to provide "military-grade" assurances, but rather "commercial-grade" assurances. The system in its basic form provides at least as good assurances as physical receipts. There are a few additional measures that raise these assurances even higher.

SSL/TLS Hardware

Remember that a way to perpetrate a proactive fraud when using SSL/TLS client authentication is to compromise the server SSL/TLS implementation. If the hardware implementation is an SSL/TLS acceleration device, making this device externally tamper evident thwarts the attack. If the hardware implementation is an internal module (such as a PCI Card), making this module internally tamper resistant thwarts the attack.

Interlocking Recorders

Figure 5:
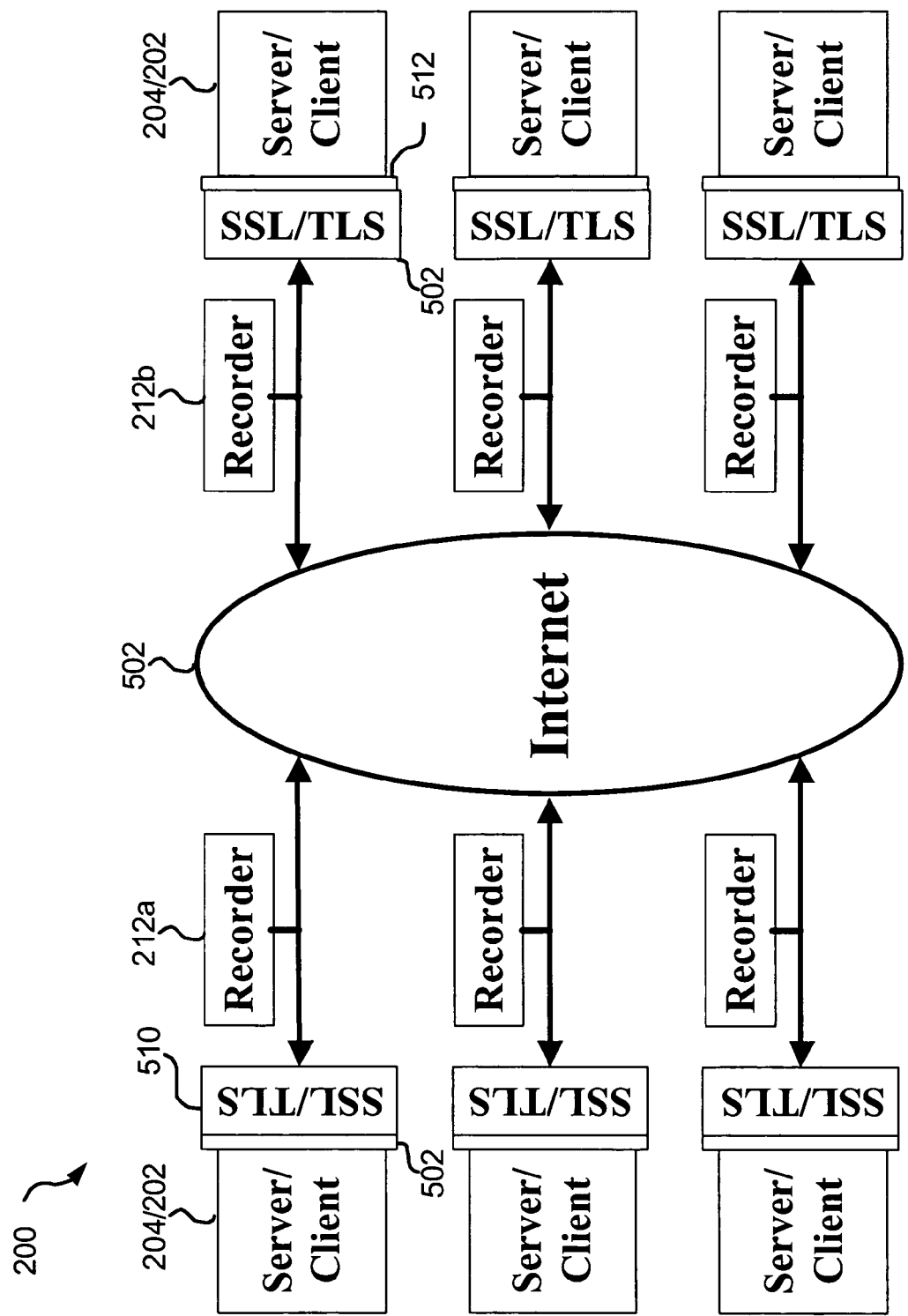
FIG. 5 is a schematic block diagram of an implementation of the device-based e-commerce guarantee system involving a wide area network in accordance with an embodiment of the invention.

FIG. 5 is a schematic block diagram of an implementation 500 of the device-based e-commerce guarantee system 200 involving a wide area network 502 such as the Internet. Typically, most forms of proactive frauds require the attacking party to control the Recorder devices. But what if each party controls a Recorder device as shown in FIG. 5? In the case of B2B applications, this may be somewhat likely if both parties value transaction guarantees. Even in B2C commerce, an ISP could offer transaction guarantees as an added service and maintain its own Recorders. If two Recorders lie in the same network path (e.g., Recorder 212a and Recorder 212b), they interlock and provide a means to detect proactive fraud. In such a scenario, there are two different session archives so that everyone will know that cheating has occurred. In the case of password authentication, because the server party has access to the client party's password, the server party is by far the more likely suspect. In the case of SSL/TLS client authentication, whichever party has a hardware TLS/SSL implementation with anti-tamper features intact can't possibly be cheating. If both parties have software implementations, there will have to be a physical investigation, but perpetrating proactive fraud with TLS/SSL client authentication is a serious undertaking that will likely leave substantial evidence.

Further Embodiments

While the basic system comprises the three components discussed above, there may be different ways to package them to suit the requirements of specific situations. By and large, these variations do not affect the basic security properties of the system, but may offer other advantages. Several such embodiments are detailed below.

Separate Sniffing and Timestamping

Figure 6:
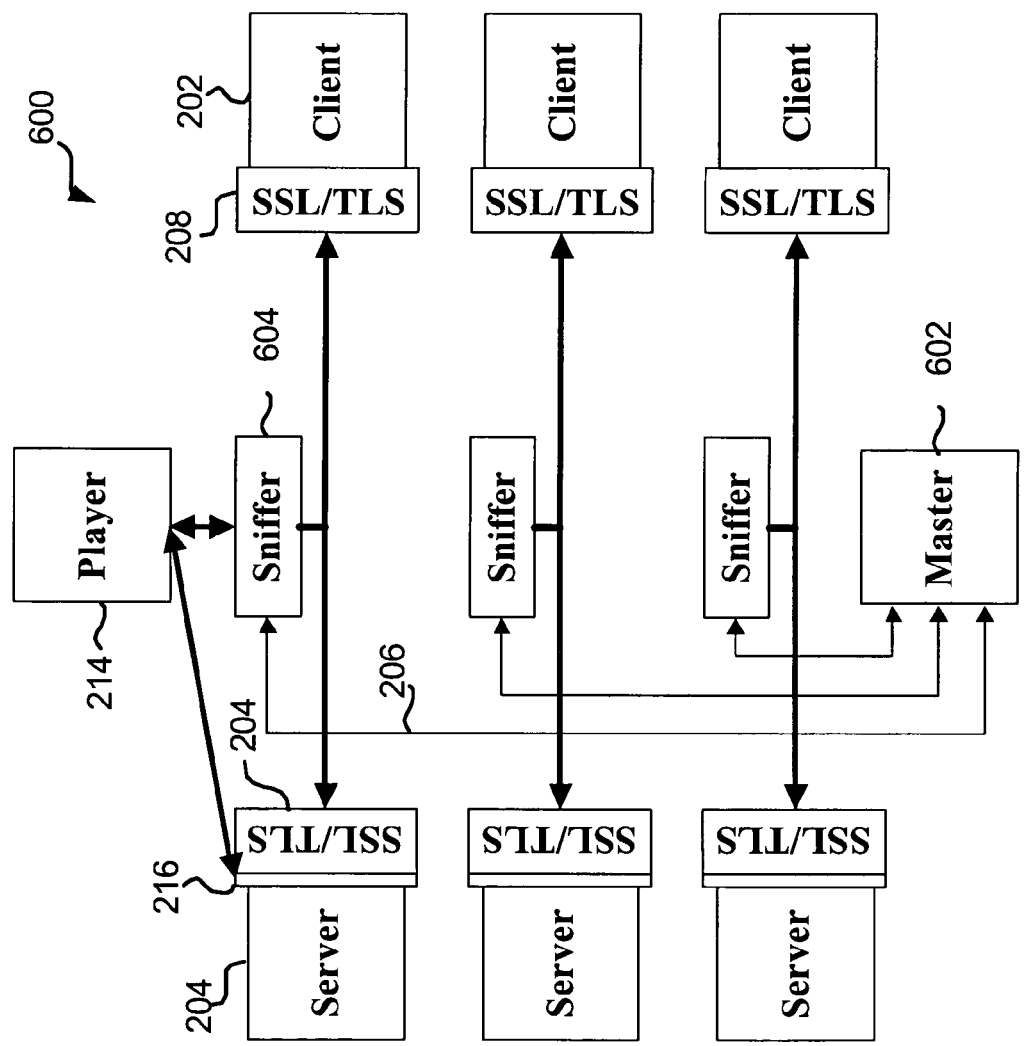
FIG. 6 is a schematic block diagram of an implementation of the device-based e-commerce guarantee system having sniffing and timestamping engines in different devices in accordance with an embodiment of the invention.

FIG. 6 is a schematic block diagram of an implementation 600 of the device-based e-commerce guarantee system 200 having sniffing and timestamping engines in different devices in accordance with an embodiment of the invention. In clustered configurations, putting the sniffing and timestamping engines into separate devices as shown in FIG. 6 may improve cost efficiency. A single master timestamping device 602 can serve an entire cluster of sniffing devices 604. The Master 602 retains the anti-tamper measures of the standard Recorder, but the Sniffers 604 require no such measures. Timestamping packets and controlling revelation are what provides the security properties in addition to those inherent in SSL/TLS. So the timestamping and revelation processes are the only ones that need physical protection. This approach concentrates the additional hardware costs of anti-tamper features and reliable time sources in a single device and provides a central point of administration for the entire cluster.

From a hardware configuration perspective, the Sniffers 604 are generally identical to the standard Recorders, except for perhaps adding another network interface to communicate with a Master. The lack of anti-tamper features enables Sniffers to take advantage of commodity hardware features such as hot-swappable disk drives. Masters 602 are also generally similar to the standard Recorders, but they do not have to include as much internal storage and do not need any of the external storage interface features. A Master may also benefit substantially more from hardware accelerated cryptography because a Master concentrates so many of these operations in a single location.

The system 600 illustrated in FIG. 6 generally operates similarly to the standard Recorder case (i.e., system 200), with three major differences. First, the Master 602 may have a timestamping queue for each Sniffer 604 in its cluster. Second, the communication between the sniffing engine and the timestamping queue and the communication between the timestamping engine and the results queue both occur over the network 206 rather than internally. These network connections are themselves protected by SSL/TLS. Third, the Master may also have an administrative engine for managing the cluster. When performing administration, the Master receives instructions from an administrator over an SSL/TLS protected connection. For certain instructions, it may then send its own instructions to the Recorders in the cluster over SSL/TLS protected connections.

Combined Sniffer or Recorder with SSL/TLS Accelerator

Figure 7:
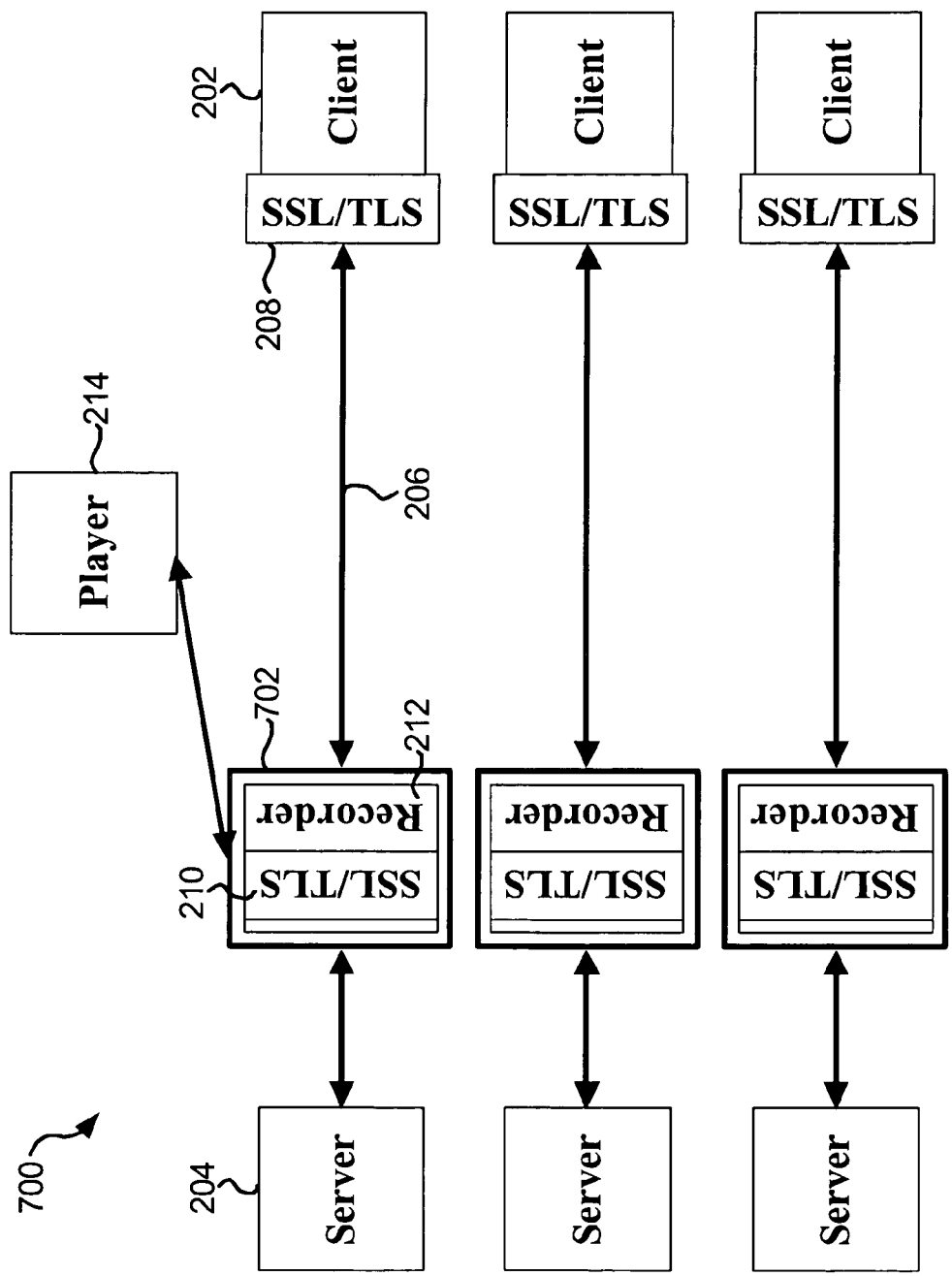
FIG. 7 is a schematic block diagram of an implementation of the device-based e-commerce guarantee system having a combined recorder and SSL/TLS accelerator in accordance with an embodiment of the invention.
Figure 8:
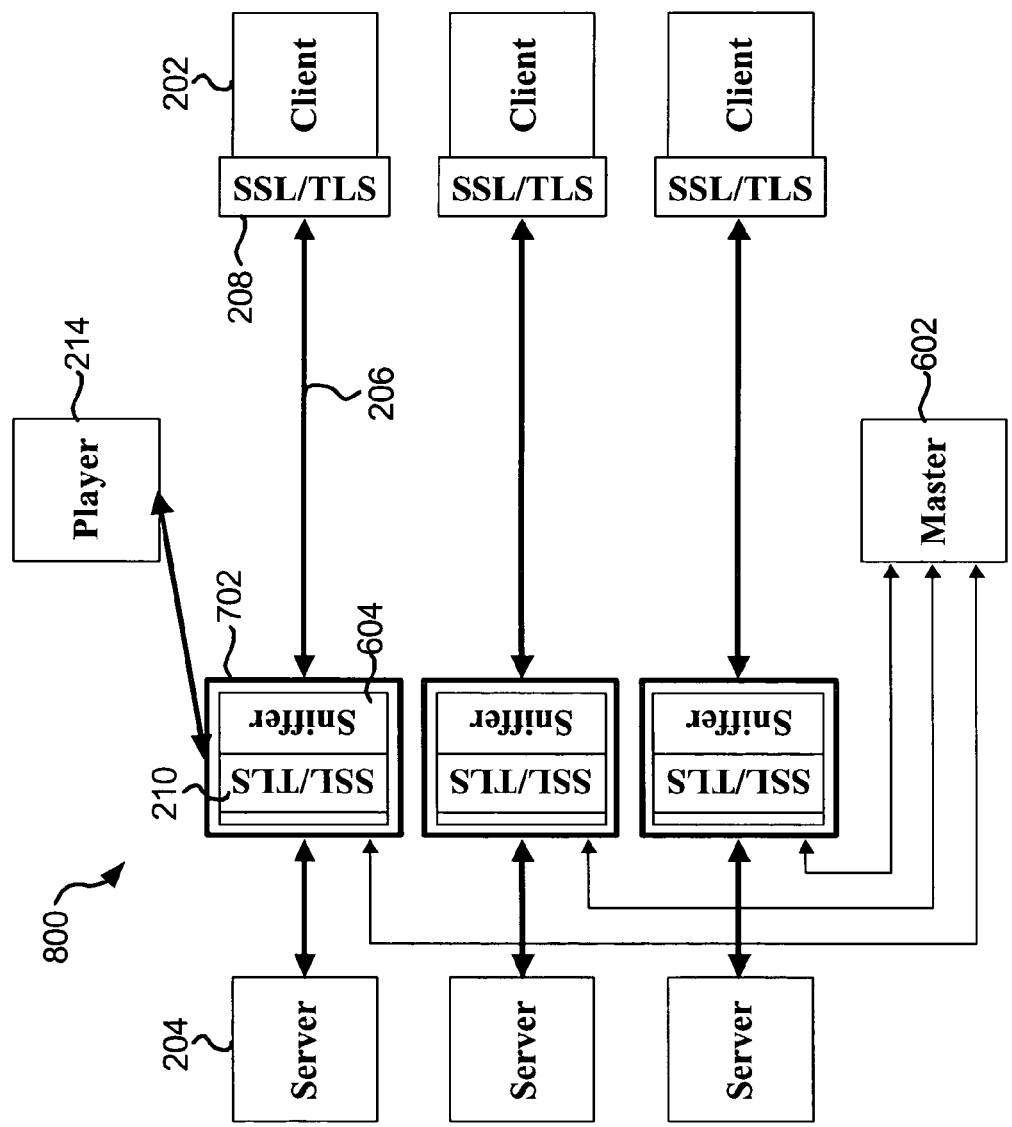
FIG. 8 is a schematic block diagram of an implementation of the device-based e-commerce guarantee system having a combined Sniffer and SSL/TLS accelerator in accordance with an embodiment of the invention.

FIG. 7 is a schematic block diagram of an implementation 700 of the device-based e-commerce guarantee system having a combined recorder and SSL/TLS accelerator 702. FIG. 8 is a schematic block diagram of an implementation 900 of the device-based e-commerce guarantee system having a combined Sniffer and SSL/TLS accelerator 802. It is very easy to combine the standard Recorder 212 or the separate Sniffer 604 with an SSL/TLS accelerator 210. As the device receives SSL/TLS traffic, the sniffing engine begins saving the session while the SSL/TLS software begins decoding it. Compared to a standalone SSL/TLS accelerator, these combined devices 702, 802 may need either substantial additional disk storage of its own or a peripheral interface to external storage. Because such accelerators are often general-purpose computers in their own right, combining them with the Recorder or Sniffer may simply require adding the corresponding software and appropriate storage capabilities. In such a situation where a general purpose computer is used for the combination accelerator/Recorder 702, adding anti-tamper features to the chassis of the device may be helpful for enhancing security.

From a technical perspective, such combined devices 702, 802 may have several advantages. Each such device can reduce the number of devices on the network by combining two types of devices into one device. However, these devices also offer the possibility for better integration with backend systems. Because the SSL/TLS accelerator decrypts the secure session, in can inject useful information into the plaintext data stream. One potential difficulty in resolving disputes is finding the correct encrypted session. A rough time interval and the client IP address may be the only data points available. But a combined device could inject the session serial number into the decrypted data stream, as an additional HTTP header entry for example. Then, a backend system may be used to capture this serial number and link it to the transaction data. When a dispute arises, the precise session is then available as part of the transaction record in the backend system.

From a operator's perspective, these combined devices 702, 802 also have some advantages because it raises the opportunity to upgrade capabilities without adding new hardware. Consider the case of the operator who initially installs an SSL/TLS accelerator to handle transaction volume. If this accelerator is actually a combined device with the Sniffer functionality suppressed and the operator decides later that it needs transaction guarantee capabilities, a simple software key can instantly enable the devices as Sniffers. Then, the operator may connect the appropriate storage systems to the Sniffers and install a single Master device. Also consider the opposite case where the operator wants to guarantee e-commerce transactions but where software SSL/TLS implementations are sufficient for the initial transaction volume. As this volume grows and the software implementation becomes saturated, the operator is able to upgrade to hardware SSL/TLS acceleration with a software key and a slight network reconfiguration.

Third Party Arbitration

A potential weakness of the system may be the component of human interpretation. A representative of the server party may run the Player against an archived session and simply lie about the results to the other party. In reality, this is not likely to be a problem because if any defrauded party escalates the matter and gets direct access to an archived session, the potential harm to the server party's reputation is substantial. However, to remove any doubt about such improprieties, the server party may commit itself to third party arbitration.

There are a number of technical possibilities for such arbitration. The simplest is to take the current system, and run the Player at the third party's location. The server party would configure the session data store and SSL/TLS implementation to only accept the credentials of the third party for performing replays. However, this approach may have a minor drawback in that the server party can back out of this arrangement at any time by simply changing access control policies.

A more sophisticated approach that overcomes this issue is super-encrypting recorded sessions under the public key of the third party arbitrator. This approach makes it very difficult, if not impossible, for the server party to back out of the arrangement. This approach has added privacy benefits. The server party cannot decrypt a saved session by itself, so it cannot directly recover any of the recorded information for uses other than dispute resolution. The vendor of the device may then be able to ship it with a pre-approved list of arbitrators or use its own certificate authority to more dynamically control this list. The Master then instructs the Sniffers to encrypt their sessions under the selected public key.

Third Party Verification

In addition to solving the problem of human interpretation, third parties may also prevent proactive fraud. As discussed above, this vulnerability stems from the fact that the party who administers Recorders and servers can create fraudulent SSL/TLS sessions if they can compromise the server SSL/TLS implementation. The use of interlocking recorders by both parties prevents this attack, but may require the client party to bear a significant cost. It is possible to greatly reduce this cost and even shift it to the server party through the use of verification devices at third party ISPs.

A basic approach is to have one or more third party ISPs record SSL/TLS sessions that use their network segments. If the client party wants to verify the honesty of the third party, it can ask any or all of the ISPs to compare their records of a session to the server party's record. If one or more ISPs in the network path do not have a corresponding record or have a record that differs from the server party's, the server party is cheating. A possible problem with this approach may be that it may impose a substantial cost in terms of storage capacity and retrieval time.

But, the ISPs do not have to store the entire session—they merely have to store a cryptographically secure hash of the session. Storing this secure hash with indexing data such as client address, server address, client_random value, and server_random value makes it easy to look up the hash of any session recorded by another party. Verifying this party's compliance simply involves taking the its full record of the session, hashing it and comparing it to the hashes captured by the ISPs in the network path. Because each hash also has a timestamp, it is very easy to tell whether the server party is cheating. MD5 hashes are 128 bits, so a single 100 GB hard drive could store the hashes of over 6 billion SSL/TLS sessions. This low storage overhead makes it feasible to embed such hashing capability in existing network devices such as routers and switches, as well as deploy it in very inexpensive dedicated hashing devices. Existing network devices may not even need to use their own local storage; they may simply forward the hashes to a central location.

Wireless Transactions

Figure 9:
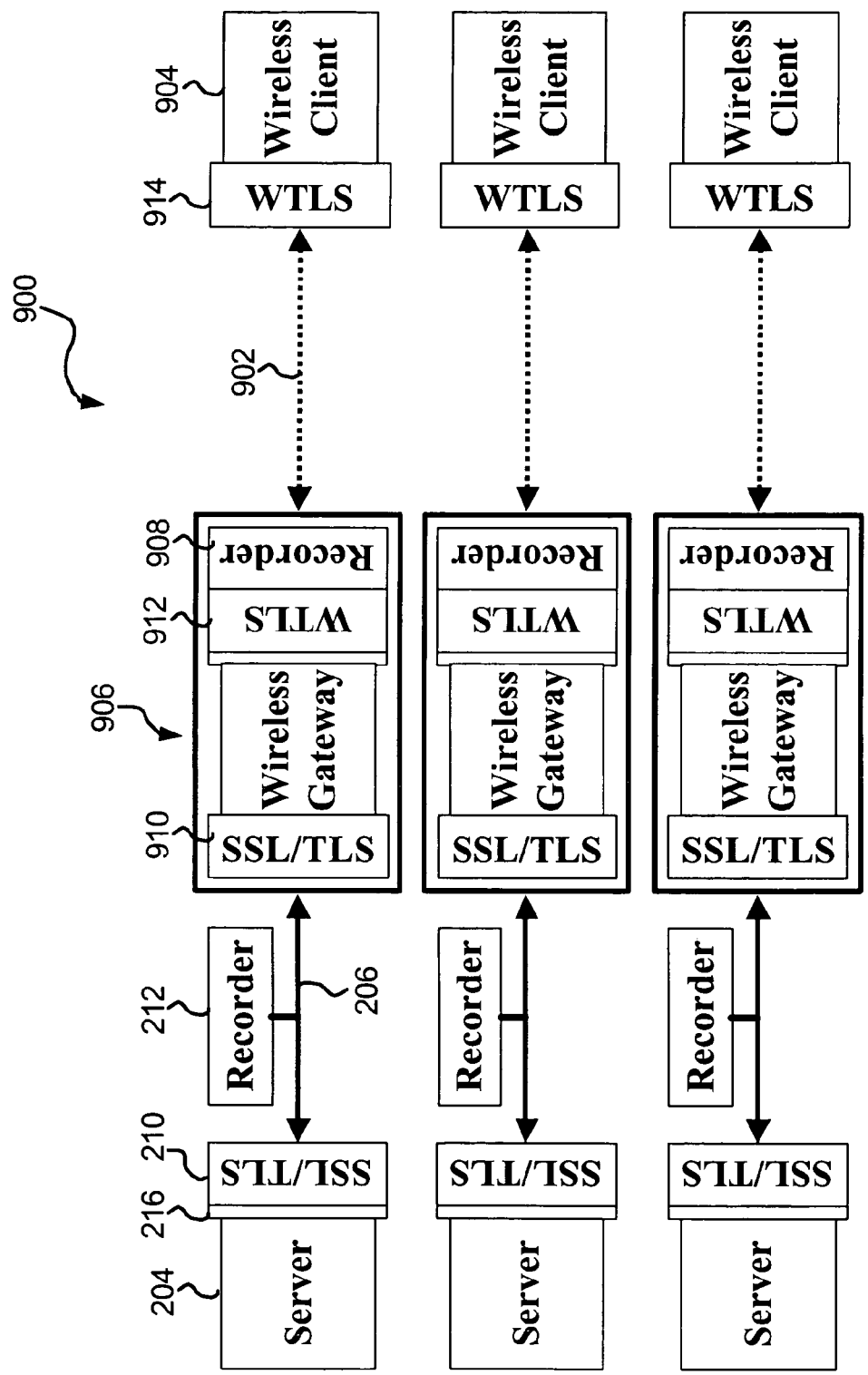
FIG. 9 is a schematic block diagram of a wireless implementation of the device-based e-commerce guarantee system in accordance with an embodiment of the invention.

FIG. 9 is a schematic block diagram of a wireless implementation 900 of the device-based e-commerce guarantee system in accordance with an embodiment of the invention. The system needs an architectural adjustment to accommodate wireless transactions. There is much discussion of how the cell phone or PDA may become a universal wallet. Typically, wireless applications have two links from a user device (i.e., a wireless device) to the application server: a link 902 (which is preferably a wireless link) from a wireless device 904 to a wireless gateway 906 and another link 206 from the wireless gateway 906 to the server 204. Because these links may use different protocols, the gateway 906 may have to decrypt the stream from the wireless device 904 and then re-encrypt the stream to the server 204. This topology brings up a more complicated form of dispute.

Now the user may dispute not only whether the server party interpreted the transaction correctly, the user may also dispute whether the gateway party transcribed the transaction correctly. Deploying a Recorder on both the device-gateway link (Recorder 908) and the gateway-server link (Recorder 212) as shown in FIG. 9 solves the problem. The Recorder 212 on the gateway-server link may be exactly the same as any other Recorder because the gateway 906 uses SSL/TLS 910 to communicate with the server. There are a couple of ways to construct the Recorder 908 in the wireless gateway 906. This Recorder 908 may be a radio receiver in its own right that captures all of the wireless signals. It may also be easier to embed the Recorder 908 in the gateway 906, sitting between the transceiver layer and the secure channel protocol implementation 912. The only issue in constructing such a Recorder is the secure channel protocol 912, 914 it uses between the wireless gateway 906 and the wireless device 904. WTLS is sufficiently similar to SSL/TLS to make it straightforward. Another protocol that may be used is WEP. Unfortunately, WEP may not provide sufficient security properties to ensure the integrity of audit trail. Other wireless security protocols may also be used although they should be evaluated on a case-by-case basis.

Figure 10:
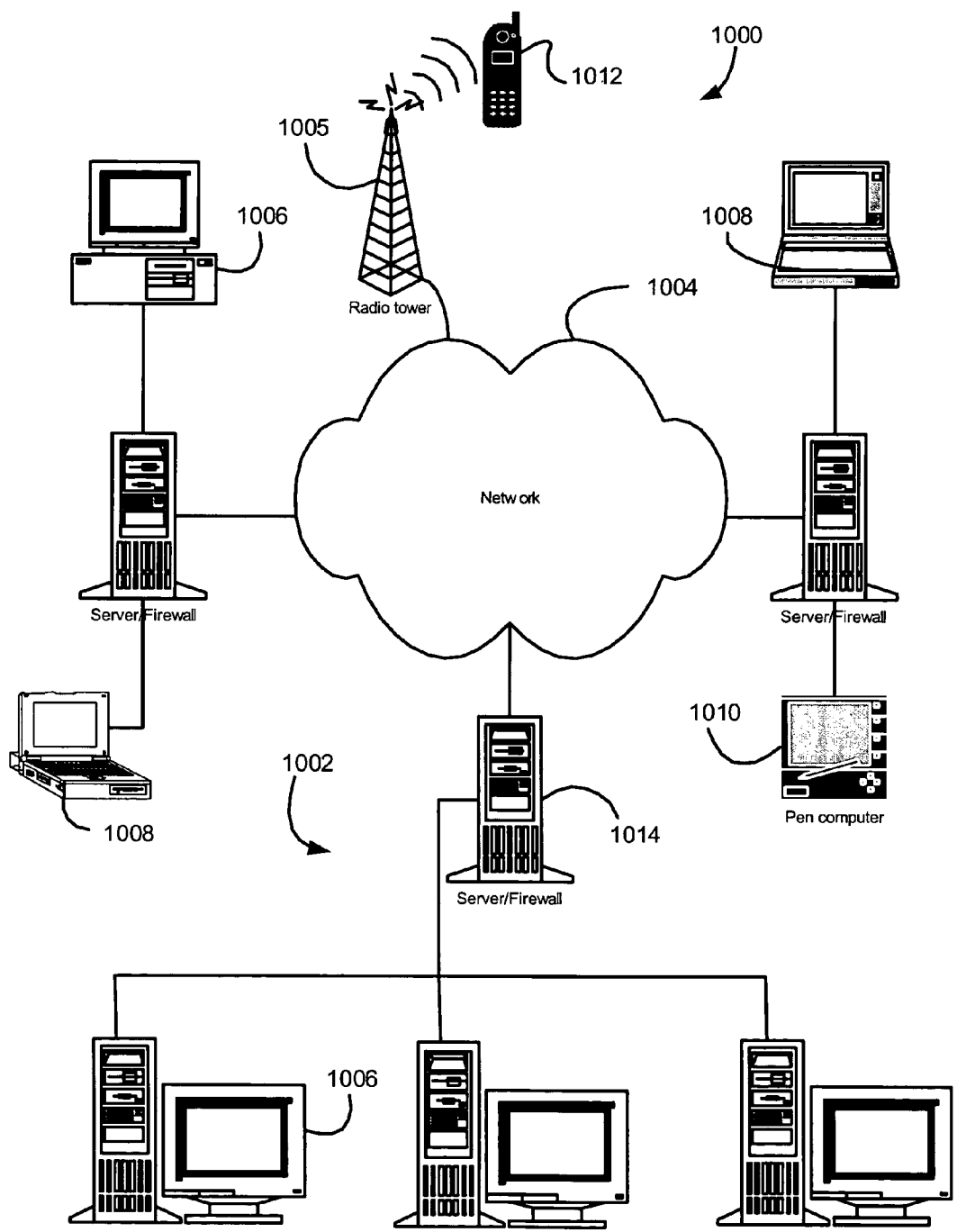
FIG. 10 is a schematic diagram of an illustrative network system with a plurality of components in accordance with an embodiment of the present invention.

FIG. 10 illustrates an exemplary network system 1000 with a plurality of components 1002 in accordance with one embodiment of the present invention. As shown, such components include a network 1004 which take any form including, but not limited to a local area network, a wide area network such as the Internet, and a wireless network 1005. Coupled to the network 1004 is a plurality of computers which may take the form of desktop computers 1006, lap-top computers 1008, hand-held computers 1010 (including wireless devices 1012 such as wireless PDA's or mobile phones), or any other type of computing hardware/software. As an option, the various computers may be connected to the network 1004 by way of a server 1014 which may be equipped with a firewall for security purposes. It should be noted that any other type of hardware or software may be included in the system and be considered a component thereof.

Figure 11:
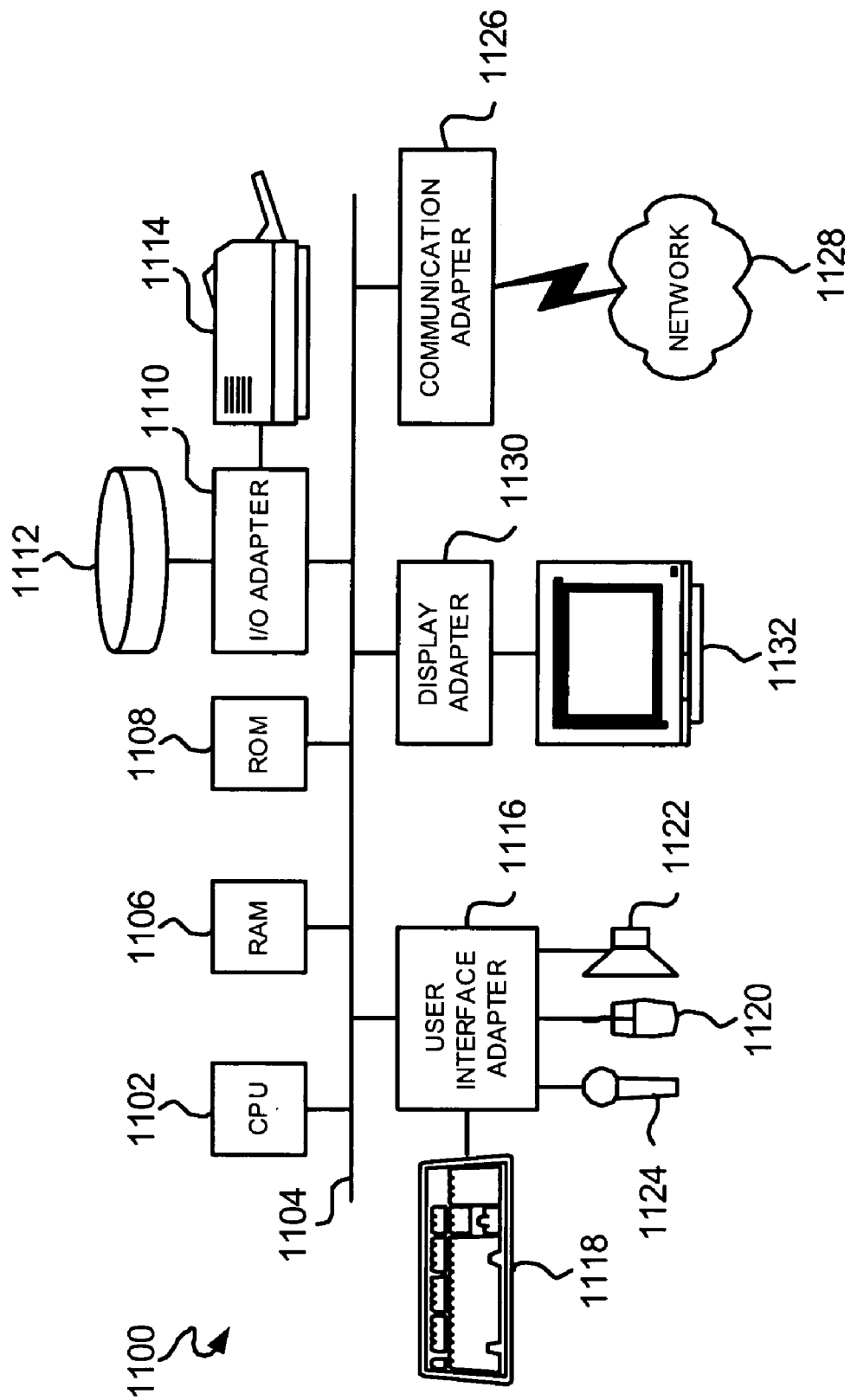
FIG. 11 is a schematic diagram of a representative hardware environment in accordance with an embodiment of the present invention.

A representative hardware environment associated with the various components of FIG. 10 is depicted in FIG. 11. In the present description, the various sub-components of each of the components may also be considered components of the system. For example, particular software modules executed on any component of the system may also be considered components of the system. In particular, FIG. 11 illustrates an exemplary hardware configuration of a workstation 1100 having a central processing unit 1102, such as a microprocessor, and a number of other units interconnected via a system bus 1104.

The workstation shown in FIG. 11 includes a Random Access Memory (RAM) 1106, Read Only Memory (ROM) 1108, an I/O adapter 1110 for connecting peripheral devices such as, for example, disk storage units 1112 and printers 1114 to the bus 1104, a user interface adapter 1116 for connecting various user interface devices such as, for example, a keyboard 1118, a mouse 1120, a speaker 1122, a microphone 1124, and/or other user interface devices such as a touch screen or a digital camera to the bus 1104, a communication adapter 1126 for connecting the workstation 1100 to a communication network 1128 (e.g., a data processing network) and a display adapter 1130 for connecting the bus 1104 to a display device 1132. The workstation may utilize an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

An embodiment of the invention utilizes HyperText Markup Language (HTML) to implement documents on the Internet together with a general-purpose secure communication protocol for a transport medium between the client and the server. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

Transmission Control Protocol/Internet Protocol (TCP/IP) is a basic communication language or protocol of the Internet. It can also be used as a communications protocol in the private networks called intranet and in extranet. When you are set up with direct access to the Internet, your computer is provided with a copy of the TCP/IP program just as every other computer that you may send messages to or get information from also has a copy of TCP/IP.

TCP/IP is a two-layering program. The higher layer, Transmission Control Protocol (TCP), manages the assembling of a message or file into smaller packet that are transmitted over the Internet and received by a TCP layer that reassembles the packets into the original message. The lower layer, Internet Protocol (IP), handles the address part of each packet so that it gets to the right destination. Each gateway computer on the network checks this address to see where to forward the message. Even though some packets from the same message are routed differently than others, they'll be reassembled at the destination.

TCP/IP uses a client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "stateless" because each client request is considered a new request unrelated to any previous one (unlike ordinary phone conversations that require a dedicated connection for the call duration). Being stateless frees network paths so that everyone can use them continuously. (Note that the TCP layer itself is not stateless as far as any one message is concerned. Its connection remains in place until all packets in a message have been received).

Many Internet users are familiar with the even higher layer application protocols that use TCP/IP to get to the Internet. These include the World Wide Web's Hypertext Transfer Protocol (HTTP), the File Transfer Protocol (FTP), Telnet which lets you logon to remote computers, and the Simple Mail Transfer Protocol (SMTP). These and other protocols are often packaged together with TCP/IP as a "suite."

Personal computer users usually get to the Internet through the Serial Line Internet Protocol (SLIP) or the Point-to-Point Protocol. These protocols encapsulate the IP packets so that they can be sent over a dial-up phone connection to an access provider's modem.

Protocols related to TCP/IP include the User Datagram Protocol (UDP), which is used instead of TCP for special purposes. Other protocols are used by network host computers for exchanging router information. These include the Internet Control Message Protocol (ICMP), the Interior Gateway Protocol (IGP), the Exterior Gateway Protocol (EGP), and the Border Gateway Protocol (BGP).

Internetwork Packet Exchange (IPX) is a networking protocol from Novell that interconnects networks that use Novell's NetWare clients and servers. IPX is a datagram or packet protocol. IPX works at the network layer of communication protocols and is connectionless (that is, it doesn't require that a connection be maintained during an exchange of packets as, for example, a regular voice phone call does).

Packet acknowledgment is managed by another Novell protocol, the Sequenced Packet Exchange (SPX). Other related Novell NetWare protocols are: the Routing Information Protocol (RIP), the Service Advertising Protocol (SAP), and the NetWare Link Services Protocol (NLSP).

A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the company the same capabilities at much lower cost by using the shared public infrastructure rather than a private one. Phone companies have provided secure shared resources for voice messages. A virtual private network makes it possible to have the same secure sharing of public resources for data.

Using a virtual private network involves encryption data before sending it through the public network and decrypting it at the receiving end. An additional level of security involves encrypting not only the data but also the originating and receiving network addresses. Microsoft, 3Com, and several other companies have developed the Point-to-Point Tunneling Protocol (PPP) and Microsoft has extended Windows NT to support it. VPN software is typically installed as part of a company's firewall server.

Wireless refers to a communications, monitoring, or control system in which electromagnetic radiation spectrum or acoustic waves carry a signal through atmospheric space rather than along a wire. In most wireless systems, radio frequency (RF) or infrared transmission (IR) waves are used. Some monitoring devices, such as intrusion alarms, employ acoustic waves at frequencies above the range of human hearing.

Early experimenters in electromagnetic physics dreamed of building a so-called wireless telegraph The first wireless telegraph transmitters went on the air in the early years of the 20th century. Later, as amplitude modulation (AM) made it possible to transmit voices and music via wireless, the medium came to be called radio. With the advent of television, fax, data communication, and the effective use of a larger portion of the electromagnetic spectrum, the original term has been brought to life again.

Common examples of wireless equipment in use today include the Global Positioning System, cellular telephone phones and pagers, cordless computer accessories (for example, the cordless mouse), home-entertainment-system control boxes, remote garage-door openers, two-way radios, and baby monitors. An increasing number of companies and organizations are using wireless LAN. Wireless transceivers are available for connection to portable and notebook computers, allowing Internet access in selected cities without the need to locate a telephone jack. Eventually, it will be possible to link any computer to the Internet via satellite, no matter where in the world the computer might be located.

Bluetooth is a computing and telecommunications industry specification that describes how mobile phones, computers, and personal digital assistants (PDA's) can easily interconnect with each other and with home and business phones and computers using a short-range wireless connection. Each device is equipped with a microchip transceiver that transmits and receives in a previously unused frequency band of 2.45 GHz that is available globally (with some variation of bandwidth in different countries). In addition to data, up to three voice channels are available. Each device has a unique 48-bit address from the IEEE 802 standard. Connections can be point-to-point or multipoint. The maximum range is 10 meters. Data can be presently be exchanged at a rate of 1 megabit per second (up to 2 Mbps in the second generation of the technology). A frequency hop scheme allows devices to communicate even in areas with a great deal of electromagnetic interference. Built-in encryption and verification is provided.

Encryption is the conversion of data into a form, called a ciphertext, that cannot be easily understood by unauthorized people. Decryption is the process of converting encrypted data back into its original form, so it can be understood.

The use of encryption/decryption is as old as the art of communication. In wartime, a cipher, often incorrectly called a "code," can be employed to keep the enemy from obtaining the contents of transmissions (technically, a code is a means of representing a signal without the intent of keeping it secret; examples are Morse code and ASCII). Simple ciphers include the substitution of letters for numbers, the rotation of letters in the alphabet, and the "scrambling" of voice signals by inverting the sideband frequencies. More complex ciphers work according to sophisticated computer algorithm that rearrange the data bits in digital signals.

In order to easily recover the contents of an encrypted signal, the correct decryption key is required. The key is an algorithm that "undoes" the work of the encryption algorithm. Alternatively, a computer can be used in an attempt to "break" the cipher. The more complex the encryption algorithm, the more difficult it becomes to eavesdrop on the communications without access to the key.

Rivest-Shamir-Adleman (RSA) is an Internet encryption and authentication system that uses an algorithm developed in 1977 by Ron Rivest, Adi Shamir, and Leonard Adleman. The RSA algorithm is a commonly used encryption and authentication algorithm and is included as part of the Web browser from Netscape and Microsoft. It's also part of Lotus Notes, Intuit's Quicken, and many other products. The encryption system is owned by RSA Security.

The RSA algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet.

The private key is used to decrypt text that has been encrypted with the public key. Thus, if I send you a message, I can find out your public key (but not your private key) from a central administrator and encrypt a message to you using your public key. When you receive it, you decrypt it with your private key. In addition to encrypting messages (which ensures privacy), you can authenticate yourself to me (so I know that it is really you who sent the message) by using your private key to encrypt a digital certificate. When I receive it, I can use your public key to decrypt it.

A browser is an application program that provides a way to look at and interact with all the information on the World Wide Web. The word "browser" seems to have originated prior to the Web as a generic term for user interfaces that let you browse (navigate through and read) text files online. By the time the first Web browser with a GUI was generally available (Mosaic, in 1993), the term seemed to apply to Web content, too. Technically, a Web browser may be considered a client program that uses the Hypertext Transfer Protocol (HTTP) to make requests of Web servers throughout the Internet on behalf of the browser user. Many of the user interface features in Mosaic, however, went into the first widely-used browser, Netscape Navigator. Microsoft followed with its Microsoft Internet Explorer. Lynx is a text-only browser for UNIX shell and VMS users. Another browser is Opera. While some browsers also support e-mail (indirectly through e-mail Web sites) and the File Transfer Protocol (FTP), a Web browser may not be required for those Internet protocols and more specialized client programs are more popular.

Hashing is the transformation of a string of characters into a usually shorter fixed-length value or key that represents the original string. Hashing may be used to index and retrieve items in a database because it is faster to find the item using the shorter hashed key than to find it using the original value. It may also used in encryption algorithms. A hashing algorithm is called the hash function.

Hashing may also used to encrypt and decrypt digital signatures (used to authenticate message senders and receivers). The digital signature is transformed with the hash function and then both the hashed value (known as a message-digest) and the signature are sent in separate transmissions to the receiver. Using the same hash function as the sender, the receiver derives a message-digest from the signature and compares it with the message-digest it also received. They should be the same. The hash function may be used to index the original value or key and then used later each time the data associated with the value or key is to be retrieved. Thus, hashing is always a one-way operation. There's no need to "reverse engineer" the hash function by analyzing the hashed values. In fact, the ideal hash function can't be derived by such analysis. A good hash function also should not produce the same hash value from two different inputs. If it does, this is known as a collision. A hash function that offers an extremely low risk of collision may be considered acceptable.

Some exemplary hash functions include the division-remainder method, the folding method, the radix transformation method and the digit rearrangement method. In the division-remainder method, the size of the number of items in the table is estimated. That number is then used as a divisor into each original value or key to extract a quotient and a remainder. The remainder is the hashed value. The folding method divides the original value into several parts, adds the parts together, and then uses the last four digits (or some other arbitrary number of digits) as the hashed value or key. The radix transformation method may be utilized where the value or key is digital. In this method, the number base (or radix) can be changed resulting in a different sequence of digits. For example, a decimal numbered key could be transformed into a hexadecimal numbered key. High-order digits can be discarded to fit a hash value of uniform length. The digit rearrangement method is simply the taking of part of the original value or key such as digits in positions 3 through 6, reversing their order, and then using that sequence of digits as the hash value or key.

A hash function that works well for database storage and retrieval might not work as for cryptographic or error-checking purposes. There are several well-known hash functions used in cryptography. These include the message-digest hash functions MD2, MD4, and MD5, used for hashing digital signatures into a shorter value called a message-digest, and the Secure Hash Algorithm (SHA), a standard algorithm, that makes a larger (60-bit) message digest and is similar to MD4.

U.S. Pat. No. 4,309,569 issued Jan. 5, 1982 to Ralph Merkle and entitled, "Method of providing digital signatures" is incorporated by reference herein and describes a use of hash functions to build trees in order to authenticate an item in a list of items.

A timestamp may be an identifier for transaction that may be used to permit ordering. A timestamp may also be used to verify digital signatures and help reduce the possibility that someone will derive a private key from the public key in a digital certificate. In order to reduce the possibility that someone will derive a private key from the public key in a digital certificate, the certifying authority may issue the key pair with an expiration date so that they may be replaced periodically. Any signature applied after the digital certificate expires is invalid. To assure that a signature was applied before the certificate expired, the certifying authority can timestamp a digital signature. Essentially, that means taking the signature, adding the current time and signing them together. When a digital signature is timestamped in this way, the software can verify that the signature was applied while the certificate was still valid. U.S. Pat. No. 5,136,647 issued to S. A. Haber et al. on Aug. 4, 1992, entitled "Method for secure timestamping of digital documents" is incorporated by reference herein and discloses a variety of technological and algorithmic components of digital timestamping including the linking of timestamp requests in a sequence, a random-witness method that uses the document being timestamped to pseudo-randomly choose timestamping witnesses, the use of a single hash value to represent a timestamp request for an accumulation or collection of digital documents, and a time-stamping process that does not explicitly require the use of a digital signature.

U.S. Pat. No. 5,136,646 issued to S. A. Haber et al. on Aug. 4, 1992, entitled "Digital document timestamping with catenate certificate" is incorporated by reference herein and discloses a use of one-way hash functions to form an unalterable linked list of timestamp certificates. This makes it effectively impossible for anyone, including the timestamping service, to retrospectively fake part of the chain.

U.S. Pat. No. 5,781,629 issued to S. A. Haber et al. on Jul. 14, 1998, entitled "Digital document authentication system" is incorporated by reference herein and discloses a method for assigning SureID numbers to documents. A SureID number is a short, unique, cryptographically secure identifier produced for any digital document, record, or message that is notarized by the Surety Digital Notary Service.

U.S. Pat. No. 5,373,561 issued to S. A. Haber et al. on Dec. 13, 1994, entitled "Method of extending the validity of a cryptographic certificate" is incorporated by reference herein and discloses a use of timestamping to renew or to extend the validity of cryptographic certifications of authenticity such as timestamp certificates and digital signatures. This use enables a digitally signed record to retain its validity even if the signer's private key is later compromised, or the key's digital certificate has expired. As long as the timestamp for the record indicates that it was signed prior to the compromise of the key, or during the digital certificate's validity period, the signature is still trustworthy. This patent also discloses a parallel use of multiple hash functions in a timestamping system.

The Secure Sockets Layer (SSL) is a commonly-used protocol for managing the security of a message transmission on the Internet. SSL has recently been succeeded by Transport Layer Security (TLS), which is based on SSL. SSL uses a program layer located between the Internet's Hypertext Transfer Protocol (HTTP) and Transport Control Protocol (TCP) layers. SSL is included as part of both the Microsoft and Netscape browsers and most Web server products. Developed by Netscape, SSL also gained the support of Microsoft and other Internet client/server developers as well and became the de facto standard until evolving into Transport Layer Security. The "sockets" part of the term refers to the sockets method of passing data back and forth between a client and a server program in a network or between program layers in the same computer. SSL uses the public-and-private key encryption system from RSA, which also includes the use of a digital certificate.

TLS and SSL are an integral part of most Web browsers (clients) and Web servers. If a Web site is on a server that supports SSL, SSL can be enabled and specific Web pages can be identified as requiring SSL access. Any Web server can be enabled by using Netscape's SSLRef program library which can be downloaded for noncommercial use or licensed for commercial use. TLS and SSL are not interoperable. However, a message sent with TLS can be handled by a client that handles SSL but not TLS.

A SSL protocol is described in the SSL Protocol Version 3.0 by the Transport Layer Security Working Group, Nov. 18, 1996 for providing communications privacy over the Internet and allowing client/server applications to communicate in a way that is designed to prevent eavesdropping, tampering, or message forgery, the disclosure of which is incorporated by reference herein in its entirety.

Transport Layer Security (TLS) is a protocol that ensures privacy between communicating applications and their users on the Internet. When a server and client communicate, TLS ensures that no third party may eavesdrop or tamper with any message. TLS is a successor to the Secure Sockets Layer (SSL). TLS is composed of two layers: the TLS Record Protocol and the TLS Handshake Protocol. The TLS Record Protocol provides connection security with some encryption method such as the Data Encryption Standard (DES). The TLS Record Protocol can also be used without encryption. The TLS Handshake Protocol allows the server and client to authenticate each other and to negotiate an encryption algorithm and cryptographic keys before data is exchanged. The TLS protocol is based on Netscape's SSL 3.0 protocol; however, TLS and SSL are not interoperable. The TLS protocol does contain a mechanism that allows TLS implementation to back down to SSL 3.0. A TLS protocol is described in the document entitled, "The TLS Protocol, Version 1" by the Network Working Group of the Internet Society, 1999, the disclosure of which is incorporated by reference herein in its entirety. This document specifies Version 1.0 of the Transport Layer Security (TLS) protocol. The TLS protocol provides communications privacy over the Internet. The protocol allows client/server applications to communicate in a way that is designed to prevent eavesdropping, tampering, or message forgery.

Wireless Transport Layer Security (WTLS) is the security level for Wireless Application Protocol (WAP) applications. Based on Transport Layer Security (TLS) v1.0 (a security layer used in the Internet, equivalent to Secure Socket Layer 3.1), WTLS was developed to address the problematic issues surrounding mobile network devices—such as limited processing power and memory capacity, and low bandwidth—and to provide adequate authentication, data integrity, and privacy protection mechanisms.

Wireless transactions, such as those between a user and their bank, require stringent authentication and encryption to ensure security to protect the communication from attack during data transmission. Because mobile networks do not provide end-to-end security, TLS had to be modified to address the special needs of wireless users. Designed to support datagrams in a high latency, low bandwidth environment, WTLS provides an optimized handshake through dynamic key refreshing, which allows encryption keys to be regularly updated during a secure session.

The Wired Equivalent Privacy (WEP) algorithm, is part of the 802.11 standard. The 802.11 standard describes the communication that occurs in wireless local area networks (LANs). The Wired Equivalent Privacy (WEP) algorithm is used to protect wireless communication from eavesdropping. A secondary function of WEP is to prevent unauthorized access to a wireless network; this function is not an explicit goal in the 802.11 standard, but it is frequently considered to be a feature of WEP. WEP relies on a secret key that is shared between a mobile station (e.g. a laptop with a wireless Ethernet card) and an access point (i.e. a base station). The secret key is used to encrypt packets before they are transmitted, and an integrity check is used to ensure that packets are not modified in transit. The standard does not discuss how the shared key is established. In practice, most installations use a single key that is shared between all mobile stations and access points.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware to create a computer system or computer sub-system embodying the method of the invention.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method, comprising:

deploying a recorder on a boundary between an external network and an internal network to detect an initiation of an encrypted data transaction between at least a server and a client across the boundary, the data transaction comprising a plurality of data packets transmitted between the server and the client, the data transaction being encrypted utilizing a session secret negotiated between the server and the client;

capturing a copy of the data transaction by copying the data packets using the recorder as the data packets are transmitted through the network between the server and the client, wherein the copied data packets are hashed as hash-time pairs;

associating, utilizing the recorder, at least one identifier with the data transaction;

generating timestamps for the copied data packets utilizing the recorder, wherein each timestamp includes information therein identifying at least a portion of the at least one identifiers, wherein each timestamp includes a digital signature, wherein the generating of timestamps adapts to a plurality of loads, wherein during a first of the loads, each hash-time pair is signed with a digital signature, wherein during a second of the loads a plurality of hash-time pairs are signed with a single digital signature, the second of the loads being heavier than the first of the loads;

storing the captured copy of the data transaction, the at least one identifier and the timestamps in one or more data stores coupled to the recorder;

mapping the at least one identifier associated with the stored captured copy of the data transaction to an entry in an index to permit retrieval of the stored copy of the data transaction and the timestamps from the data store via the index;

receiving from the client, a dispute concerning the contents of the data transaction;

authenticating the client;

if the client is authenticated, retrieving the captured copy of the data transaction from the data store utilizing the entry;

submitting a portion of the captured copy of the data transaction to at least one of the server and the client to obtain the session secret;

decrypting the captured copy of the data transaction utilizing the obtained session secret; and comparing data received by at least one of the server and the client during the data transaction with data contained in the decrypted captured copy of the data transaction to determine if the received data matches the captured data to thereby resolve the dispute concerning the contents of the data transaction.

2. The method of claim 1, wherein the captured copy of the data transaction and the at least one identifier are stored in a first data store and the timestamps are stored in a second data store.

3. The method of claim 1, wherein the external network includes a wireless network.

4. The method of claim 1, wherein the data transmitted during the data transaction is encrypted by the server and client utilizing at least one of a secure sockets layer protocol and a transport layer security protocol.

5. The method of claim 1, wherein the timestamps are generated utilizing a remote time source coupled to the recorder.

6. The method of claim 1, wherein the recorder has a sniffing engine to capture the copy of the data transaction and associates the at least one identifier to the captured copy of the data transaction, wherein the recorder has a time-stamping engine to generate the timestamps for the captured copy of the data transaction.

7. The method of claim 1, wherein the hashes of the copied data packets are stored instead of the captured copy of the data transaction.

8. The method of claim 7, wherein the hashes are compared to hashes of versions of the data packets for the same data transaction captured at another location between the server and client to verify at least one of: the authenticity of the captured copy of the data transaction and the integrity of the captured copy of the data transaction.

9. A system, comprising:

a recorder for detecting on a boundary between an external network and an internal network an initiation of an encrypted data transaction between at least a server and a client across the boundary, the data transaction comprising a plurality of data packets transmitted between the server and the client, the data transaction being encrypted utilizing a session secret negotiated between the server and the client;

the recorder having a sniffing engine for capturing a copy of the data transaction by copying the data packets as the data packets are transmitted through the network between the server and the client, wherein the copied data packets are hashed as hash-time pairs;

the recorder having logic for associating at least one identifier with the data transaction;

the recorder having a time-stamping engine for generating timestamps for the copied data packets, wherein each timestamp includes information therein identifying at least a portion of the at least one identifiers, wherein each timestamp includes a digital signature, wherein the generating of timestamps adapts to a plurality of loads, wherein during a first of the loads, each hash-time pair is signed with a digital signature, wherein during a second of the loads a plurality of hash-time pairs are signed with a single digital signature, the second of the loads being heavier than the first of the loads;

one or more data stores coupled to the recorder for storing therein the captured copy of the data transaction, the at least one identifier and the timestamps;

the sniffing engine mapping the at least one identifier associated with the stored captured copy of the data transaction to an entry in an index to permit retrieval of the stored copy of the data transaction and the timestamps from the data store via the index;

a player in communication with the recorder for obtaining the captured copy of the data transaction from the one or more data stores utilizing the entry, submitting a portion of the captured copy of the data transaction to at least one of the server and the client to obtain the session secret, and decrypting the captured copy of the data transaction utilizing the obtained session secret.

10. The system of claim 9, wherein the captured copy of the data transaction and the at least one identifier are stored in a first data store and the timestamps are stored in a second data store.

11. The system of claim 9, wherein the data transmitted during the data transaction is encrypted by the server and client utilizing at least one of a secure sockets layer protocol and a transport layer security protocol.

12. The system of claim 9, wherein each timestamp includes a digital signature.

13. The method of claim 9, wherein the copied data packets are hashed, and wherein the hashes of the copied data packets are stored instead of the captured copy of the data transaction.

14. The method of claim 13, wherein the hashes are compared to hashes of versions of the data packets for the same data transaction captured at another location between the server and client to verify at least one of the authenticity of the captured copy of the data transaction and the integrity of the captured copy of the data transaction.

* * * * *